(12) United States Patent
Higgins

(10) Patent No.: US 9,324,096 B2
(45) Date of Patent: Apr. 26, 2016

(54) SYSTEM AND METHOD FOR COMMUNICATING INFORMATION

(71) Applicant: Brian William Higgins, Dayton, MD (US)

(72) Inventor: Brian William Higgins, Dayton, MD (US)

( * ) Notice: Subject to any disclaimer, the term of this patent is extended or adjusted under 35 U.S.C. 154(b) by 0 days.

(21) Appl. No.: 14/621,481

(22) Filed: Feb. 13, 2015

(65) Prior Publication Data

US 2015/0161676 A1 Jun. 11, 2015

Related U.S. Application Data

(63) Continuation of application No. 13/941,821, filed on Jul. 15, 2013, now Pat. No. 9,000,928, which is a continuation of application No. 12/636,736, filed on Dec. 12, 2009, now Pat. No. 8,487,772.

(60) Provisional application No. 61/122,387, filed on Dec. 14, 2008.

(51) Int. Cl.
| | |
|---|---|
| *G08B 23/00* | (2006.01) |
| *G06Q 30/02* | (2012.01) |
| *H04L 29/08* | (2006.01) |
| *G06K 9/00* | (2006.01) |

(52) U.S. Cl.
CPC ........ *G06Q 30/0269* (2013.01); *G06K 9/00281* (2013.01); *G06Q 30/0201* (2013.01); *G06Q 30/0251* (2013.01); *H04L 67/22* (2013.01)

(58) Field of Classification Search
CPC . G08B 23/00; G06Q 30/0201; G06F 21/6218
USPC ............. 340/573.1, 573.4, 500, 501, 539.22, 340/539.32; 600/300, 306, 346, 549
See application file for complete search history.

(56) References Cited

U.S. PATENT DOCUMENTS

| | | | |
|---|---|---|---|
| 4,931,865 A | 6/1990 | Scarampi | |
| 6,292,688 B1 * | 9/2001 | Patton | A61B 5/16 600/300 |
| 6,484,148 B1 | 11/2002 | Boyd | |
| 6,527,711 B1 | 3/2003 | Stivoric et al. | |
| 6,571,279 B1 | 5/2003 | Herz et al. | |
| 6,873,710 B1 | 3/2005 | Cohen-Solal et al. | |
| 6,922,672 B1 | 7/2005 | Hailpern et al. | |
| 6,971,973 B2 | 12/2005 | Cohen et al. | |
| 6,978,470 B2 | 12/2005 | Swix et al. | |
| 7,073,129 B1 | 7/2006 | Robarts et al. | |
| 7,106,204 B2 | 9/2006 | Pilu et al. | |
| 7,133,837 B1 | 11/2006 | Barnes, Jr. | |
| 7,224,282 B2 | 5/2007 | Terauchi et al. | |
| 7,395,507 B2 | 7/2008 | Robarts et al. | |
| 7,515,044 B2 | 4/2009 | Welch et al. | |
| 7,636,456 B2 | 12/2009 | Collins et al. | |
| 7,912,537 B2 | 3/2011 | Lee et al. | |

(Continued)

*Primary Examiner* — Tai T Nguyen

(57) ABSTRACT

A system and method for effectively communicating information using at least one mode of communication is described, in which information recipients proximate to a communications device within a pre-determined space and during a pre-determined time period are identified, from whom physiological state information is obtained that, when coupled with other characteristics information, is used to select from a plurality of information elements at least one information element to better target the information elements. The information element is then provided to the communications device so that it may be provided to the information recipients in the pre-determined space in a manner that is sensed by the information recipients.

10 Claims, 9 Drawing Sheets

(56) References Cited

U.S. PATENT DOCUMENTS

| | | |
|---|---|---|
| 8,773,245 B2 | 7/2014 | Canora et al. |
| 2003/0220584 A1 | 11/2003 | Honeyager et al. |
| 2004/0147814 A1 | 7/2004 | Zancho et al. |
| 2004/0217850 A1 | 11/2004 | Perttunen et al. |
| 2005/0116820 A1 | 6/2005 | Goldreich |
| 2006/0080357 A1* | 4/2006 | Sakai .................... H04H 60/45 |
| 2006/0252976 A1 | 11/2006 | Rosero |
| 2006/0277474 A1 | 12/2006 | Robarts et al. |
| 2007/0066403 A1 | 3/2007 | Conkwright |
| 2007/0167689 A1 | 7/2007 | Ramadas et al. |
| 2007/0271518 A1* | 11/2007 | Tischer ................. H04H 60/31 715/744 |
| 2008/0004950 A1 | 1/2008 | Huang et al. |
| 2008/0004951 A1 | 1/2008 | Huang et al. |
| 2008/0140159 A1 | 6/2008 | Bornhoft et al. |
| 2008/0146892 A1 | 6/2008 | LeBoeuf |
| 2008/0249969 A1 | 10/2008 | Tsui et al. |
| 2008/0262872 A1 | 10/2008 | Perry et al. |
| 2008/0288406 A1 | 11/2008 | Sequin et al. |
| 2009/0013052 A1 | 1/2009 | Robarts et al. |
| 2009/0112695 A1 | 4/2009 | Jung et al. |
| 2009/0192874 A1 | 7/2009 | Powles et al. |
| 2009/0234666 A1 | 9/2009 | Crawford et al. |
| 2009/0270170 A1 | 10/2009 | Patton |
| 2012/0143693 A1 | 6/2012 | Chung et al. |
| 2012/0324492 A1 | 12/2012 | Treadwell, III et al. |

\* cited by examiner

500

| ID No. | Recipient-Provided Characteristics | | | 3d Party-Provided Characteristics | | | Estimated/Predicted Characteristics | | |
|---|---|---|---|---|---|---|---|---|---|
| | Age | Income | Spouse | Spending | Home | Politics | Buying | Price | Rating |
| A | 21 | 62.2 | Y | 0.8 | Y | 1 | 15-14-2 | 0.72 | 650 |
| B | 38 | 42.3 | N | 0.3 | Y | 1 | 15-15-3 | 0.28 | 500 |
| C | 42 | 31.2 | N | -0.2 | Y | 2 | 8-8-15 | 0.15 | 620 |
| D | 68 | 122.1 | Y | 0.6 | Y | 2 | 4-2-8 | 0.91 | 700 |
| ... | ... | ... | ... | ... | ... | ... | ... | ... | ... |
| M | 41 | 226.5 | Y | 0.9 | Y | 3 | 18-6-9 | 0.55 | 700 |

| ID No. | Sensed Physiological Characteristics | | | | | | | | |
|---|---|---|---|---|---|---|---|---|---|
| | Head Position | Motion (x,y,z) | Distal Pulse | Skin Temp | Δ O$_2$ | Weight | Audio Level (dB) | Blood Content Index | Systolic Press |
| A | Up | L | 68 | 92 | -0.3 | 156 | 82 | 0.95 | 134 |
| B | Dn | L | 100 | 95 | 0.8 | 133 | 75 | 0.98 | 120 |
| C | Dn | R | 95 | 99 | 0.1 | 189 | 71 | 1.04 | 90 |
| D | Up | N/A | 80 | N/A | -0.3 | 154 | 88 | 1.12 | 105 |
| ... | ... | ... | ... | ... | ... | ... | ... | ... | ... |
| M | Up | N/A | 73 | N/A | -0.4 | 102 | 74 | 0.91 | N/A |

| Information Recipient Data | | | | Static Impressions | | Broadcast Advertisements | | Theater Advertisement Scripts | |
|---|---|---|---|---|---|---|---|---|---|
| ID No. | Known Segment | Assessment Time | Assessed Segment | SI1 | SI2 | BA1 | BA2 | AS1 | AS2 |
| A | N/A | Date/Time | 7 | Y1 | N | Y3 | Y2 | Y2 | Y1 |
| B | 12 | Date/Time | N/A | N | N | N | Y3 | Y2 | Y2 |
| C | 16 | Date/Time | 15 | N | Y3 | N | Y3 | Y4 | Y2 |
| D | 2 | Date/Time | 3 | Y1 | N | N | Y5 | N | N |
| ... | ... | ... | ... | ... | ... | ... | ... | ... | ... |
| M | N/A | Date/Time | 1 | Y1 | N | N | Y3 | N | N |
| Average | 6 | Date/Time | 5.2 | Y1 | N | N | Y3 | Y2 | Y2 |

SYSTEM AND METHOD FOR COMMUNICATING INFORMATION

CROSS-REFERENCE TO RELATED APPLICATION

This application is a continuation of and claims the benefit of U.S. application Ser. No. 13/941,821, now U.S. Pat. No. 9,000,928, filed Jul. 15, 2013, which is a continuation of and claims the benefit of U.S. application Ser. No. 12/636,736, now U.S. Pat. No. 8,487,442, filed Dec. 12, 2009, which claims the benefit of U.S. Provisional Application No. 61/122,387, filed Dec. 14, 2008.

BACKGROUND OF THE INVENTION

1. Field of Invention

The present invention relates to systems and methods for communicating information. In particular, the present invention relates to systems and methods for tailoring information that is or will be provided or delivered to information recipients based on one or more characteristics of the one or more information recipients.

2. Description of Related Art

Human communication is the transmission of information by oral, written, electronic or other modalities, from one person to another that is received and understood. Information may include, but is not limited to, data, statistics, images, color, indicia, thoughts, and feelings. To be effective communication, the information must be accurate, clear, concise, coherent, and, most importantly, appropriate to the person receiving the information.

Whether information being communicated is effectively communicated is best judged by the information recipient. The person communicating the information may not be able to judge the effectiveness of his or her communication without stepping into the shoes of the information recipient. However, the communicator may be able to predict the effectiveness of his or her communication once characteristics of the information recipient are known. For example, the effectiveness of communicating a marketing message about a product may be enhanced by first assessing the characteristics of the message's known recipients, or the individual or collective characteristics of the intended audience as a whole, in order to develop, and then deliver, advertising information that the individual or audience, or at least a segment of the information recipients, will actually respond to.

The characteristics of an information recipient describe the information recipient's state of being. The characteristics most often used to describe an information recipient for purposes of assessing, and enhancing, the communication of information intended to be provided (or delivered, uploaded, downloaded, transferred, or otherwise made available) to the information recipient include known, perceived, or predicted geographic, demographic, psychographic, and behavioristic characteristics, each of which is described below.

Geographic Characteristics.

Because information recipients are often strongly influenced by societal factors that are unique to their locale, geographic location is a factor in assessing the effectiveness of content communicated to information recipients. For example, information recipients that live and work in rural areas may be more interested in and responsive to information, thoughts, feelings, and images related to rural issues. Similarly, information recipients that live in relatively cold or temperate regions may be interested and responsive to information, thoughts, feelings, and images related to products and activities that concern cold or warm weather activities. Geographic characteristics can be used to effectively segment a population into one or more target audiences.

Demographic Characteristics.

Because information recipients are influenced by criteria such as age, race, religion, gender, income level, family size, occupation, education level and marital status, among others, demographic information is another factor to consider in assessing the effectiveness of content communicated to information recipients. Demographic characteristics relate to the interests, needs and abilities of the information recipients, and, therefore, they can be crucial in establishing effective communication between individuals. For example, a 50-year old, professional, single male with a high annual income and a 30-year old married female with several children and with less financial means may have different interests in terms of vacation destinations.

Psychographic characteristics.

The psychographic characteristics of information recipients strongly influence their individual and collective decision-making processes. Each information recipient is also greatly influenced by other's attitudes, beliefs and emotions. Thus, psychographic information is another factor in assessing the effectiveness of content communicated between individuals, and is useful in segmenting information recipients. Psychographic variables may include, but are not limited to, a personal desire for a different or greater amount of status, power, appearance, and money. For example, information recipients that have a strong desire for a different personal appearance may be more interested and responsive to information about clothing and clothing accessories than, say, an information recipient that is influenced by greed (although the two are not mutually exclusive). Similarly, information recipients that view themselves as being cutting edge or high tech may be interested and attuned to certain information that is less interesting to information recipients that consider themselves socially responsible (again, the two are not mutually exclusive). There are many psychographic characteristics, including, but not limited to, beliefs about consumer markets, lifestyle attitudes, fun-seeking desires, attitudes about family, trendiness, emotions concerning personal hobbies and activities, status seeking desires, sports enthusiasm, conservativeness, entertainment reactions, and beliefs about social responsibility.

Behavioristic Characteristics.

Behavioristic information may also be used to tune the content of a communication and segment information recipients because those characteristics strongly influence decision-making processes. For example, information recipients may be more receptive to information about particular brands that they are familiar with. They may also be more receptive to information about people, products, and services that they have been loyal to in the past. They may be receptive to information when the cost of the information is low. People also tend to act with a regular frequency or seasonally, and they are habitual and patternistic. Thus information delivered or provided in concert with those habits and patterns may be more effectively received.

As suggested above, segmentation is the process of breaking down a larger group of information recipients into smaller groups to assess specific geographic, demographic, psychographic and behavioristic characteristics of the groups. Each group requires different strategies for effectively communicating information because each segment group, considered as a whole and separate from a larger group, has different or unique characteristics. Traditionally, different groups of information recipients were analyzed, and then a script, an advertising impression, a message, or some other information was developed that contained information targeted just for that group, and then provided or delivered to that group using one of several communication modalities. Unfortunately, that analysis process has always been a static one in which a snapshot of the characteristics of the group is prepared and used repeatedly for one time, or for many times in the future, even after the characteristics of the group have changed. Because the characteristics of a group inevitably change over time, the snapshot view of the group can quickly become less valuable to those seeking a response to the information they have communicated.

Below are some solutions others have developed to effectively communicate information to one or more information recipients.

In connection with advertising over broadcast television, several companies have developed systems that enable cable and satellite television operators to deliver targeted information (principally commercial advertisements) to their viewers. The systems employs passive and permissive viewer profiling that captures the demographic, psychographic and behavioral data of viewer's "on-demand" television entertainment requests. The resulting individualized viewer profiles enable the owner and operators of cable and satellite television system to deliver targeted television commercials that address the specific interests and brand preferences of a particular viewer, which is believed to maximize the return on investment for advertisers. A passive system like that one, however, does not require the television viewer to do anything, other than watch television.

U.S. Pat. No. 6,971,973 discloses a system for providing customized content to a consumer on a network-enabled exercise device. The system and method involve providing an exercise device having a display console, receiving user profile information associated with a consumer operating the exercise device, receiving content information identifying available content for display on the display console (the content information including selection criteria for selecting content to be displayed from the available content), selecting content for display to the consumer based on the content information and the user profile information, and presenting an impression of the selected content to the consumer on the display console. The user profile information includes (1) demographic information such as age, gender, weight, height, income level, education level and geographic location; (2) psychographic information about the consumer identifying the consumer's personal interests; (3) historical information relating to the consumer's operation of one or more network-enabled exercise devices; and (4) current information relating to the consumer's present operation of a network-enabled exercise device. The disclosed communication system is, unlike the one previously described, an active system that employs user-provided criteria to determine what kind of targeted information is delivered or provided to the user. The system, however, is limited to providing targeted information to an individual only, which requires a large number of scripts to be generated so that the information may be targeted to the individual who may in fact have very esoteric or specialized interests.

U.S. Pat. No. 6,978,470 is directed to systems and methods for inserting viewer-specific advertising content into regular television broadcast programming. The process involves a viewer device such as, for example, a set top box located at a home or viewer location, which gathers data identifying the characteristics of a viewer such as, for example, the viewer's age, gender, marital status, geographic location, and viewing habits. The viewer characteristic data are used to identify advertising content corresponding to the characteristics of the viewer. The viewer device includes a broadcast receiver for receiving broadcast content transmitted by a broadcast content provider over a broadcast network. The viewer device further comprises a broadband connection device for receiving advertising content transmitted by an advertising content server over a broadband network. Upon receiving the advertising content, the viewer device selects advertisements matching the viewer's characteristics and inserts the selected advertisements into the broadcast programming. Thereafter, the viewer device transmits the broadcast content and inserted advertising content to a television for viewing at the home or viewer location. That system, like the exercise device described above, employs user-provided characteristics, but it only uses characteristics of a single user. Also, like the exercise device, a large number of scripts must be generated in order to provide enough targeted information for various individuals possessing specific characteristics. Another drawback to that system is that it only provides targeted information to one viewer, even if a group of people are gathered around the television.

The above solutions are focused on delivering or providing customized information to individuals based on the individual's geographic, demographic, psychographic and behavioristic characteristics. Those solutions are not feasible where a single mode of communication is used to deliver or provide information to more than one information recipient, such as a broadcast television signal shown to a group of information recipients, because the group will likely have, collectively, a defining set of characteristics that are different than the set of characteristics defining any one of the individuals in the group. Moreover, those solutions are not feasible where the mode of communication is moving relative to the information recipients, or where the segment of information recipients is dynamic, such as in a busy public location.

The deficiencies of the above inventions are partly addressed in U.S. Pat. No. 6,922,672, which discloses a system and method for providing target groups of customers with a plurality of promotions for a plurality of goods. Active customers are tracked for each target group. Active customers can include customers with portable devices, customers with hand-held devices, customers who are viewers of a pay-per-view system, and customers who are viewers of a web site. The promotions for each target group are calculated based on the promotional objectives for each target group and the conditions in the operating environment. Selected promotions are sent to the active customers for each target group. The system tracks active customers by monitoring the changes of active customers on a real-time basis in a geographical area in which customers are to receive promotions (i.e., by using geographic characteristics), and updates the changes of active customers on a real-time basis. It calculates target group characteristics on a real-time basis and disseminates promotional information (e.g., sales of products) to the target groups based on changes in the operating environment. A database is used to store customer profile and customer buying history information. The promotional objectives take into account the time of day, seasonal factors, and the acceptance rate of the target group. Tracking of the active customers is accomplished through the use of an electronic signaling device, such as a pager operating in a radio-frequency-based local area network, or through the use of a cookie mechanism to identify active sessions of a web site.

That system, and the ones previously described, does not automatically evaluate the characteristics of a segment of information recipients in real-time (or near real-time) in order to automatically tune the content of the information that is communicated. U.S. Pat. No. 6,873,710 identifies that problem, explaining that the demographics of an audience in public places cannot be accurately predicted in advance; thus, any presented content must generally appeal to the population at large that passes by a communications device.

To solve that problem, at least in part, the U.S. Pat. No. 6,873,710 discloses a method and apparatus for tuning the content of information presented to an audience, for example, on a large display screen or an information kiosk, based on an automatic evaluation of the demographic characteristics of the audience. The disclosed content selection and driving system (i) extracts relevant characteristics about the audience, (ii) analyzes the characteristics, (iii) modifies the presented content based on the analysis, and (iv) records relevant statistics for reporting. The invention works as follows: an audio/visual analyzer (i.e., a camera and face recognition software) derives audience characteristics and other information about the public reaction to the presented advertising or information by analyzing audio or video information, or both. The derived characteristics (i.e., men, women, older, younger, tall, short, the number of people, how long the average person watches, etc.) are utilized to tune the content of the advertising or information content delivered to the current audience. A reporting module receives real-time audience statistics and an indication of the selected content. Reports can be generated for the content provider, such as advertisers, that indicate the exposure of various population segments to the presented content and the reaction of the audience to the presented content. U.S. Publication US 2009/0192874 discloses a system similar to that described above.

The U.S. Pat. No. 6,873,710 describes a passive system for obtaining characteristics of a target audience, which has obvious limitations, not to mention the technical limitations associated with face recognition software and the use of cameras for passively collecting demographic and other characteristics. Moreover, the U.S. Pat. No. 6,873,710 does not address the problem in the prior art of predicting the characteristics of a segment of information recipients that may be proximate a communications device.

U.S. Pat. No. 6,484,148, on the other hand, discloses a system and method for displaying advertisements that are specifically targeted to one or more individuals within the device's advertising range based on information relating to one or more of those individuals. That targeted content is achieved by providing a device with the means for receiving and identifying the individuals prior to displaying or during the display of selected targeted advertisements. According to one preferred embodiment of the disclosed invention, signals from one or more proximate individuals are received by the system and a consumer profile or the like is identified based on the signal. Such identifying signals may include the signature signals emitted by cellular telephones or the signature signals emitted by devices such as automobile transponders which allow motorists to pass through highway tolls without stopping to pay the toll collector, e.g., automatic toll charging systems. Once the advertising device receives the identifying signal(s) and identifies the one or more individuals, the device retrieves information from a consumer profile database which includes information regarding the individuals, and that information is then used to select and display targeted advertising to the individuals.

There are a wide variety of modalities for communicating information to information recipients, as the above examples illustrate. Modalities include using body language, computer and television displays (such as client computers and kiosks), physically handing out materials, providing or delivering static impressions and displays (such as electronic billboards), and radiowave and microwave receivers (such as radios and satellite radios), to name a few. One major drawback of communications systems designed to provide or deliver a large number of impressions to a large and relatively undifferentiated audience is that the money invested in sending those impressions is ineffectively spent on messages that reach the wrong audiences under the wrong circumstances. For example, the proportion of a national television audience that is thought to be genuinely interested in a national advertisement campaign (or believed by the advertiser to be a prime candidate to purchase their product), normally ranges from about 20 to 40 percent, according to some reports. A larger dissemination of impressions is suitable only for a limited type of information categories that are truly national in scope and relatively impervious to regional and seasonal variation or other characteristics. But that money investment is small, however, compared to the cost of multiple regional information dissemination campaigns to address various segment characteristics, such as geography. Thus, any system that can automatically adjust the information being provided or delivered to one or more information recipients based on both user-provided and passively collected characteristics about individuals who are proximate or may become proximate a communications device would reduce the cost of providing or delivering targeted information to segments of information recipients.

Although calculated or predicted geographic, demographic, psychographic, and behavioristic characteristics may be used to effectively tailor the content of information being communicated to information recipients, and using inferred or derived physiological data about information recipients may also be useful in predicting how a segment of information recipients may react to information being communicated to them, those calculated, predicted, inferred or derived characteristics are not effective in gauging, in real- or near real-time, how information recipients, or a targeted segment thereof, are actually psychologically or physiologically reacting to the information being received. Actual biological response information is necessary to assess whether it makes sense to make further adjustments to the content of the information being communicated to information recipients such that the effectiveness of the communication is maximized.

This is exemplified by the systems and methods previously described, which lack direct information about an individual's biological reaction to information being communicated to them. That is, the techniques described above rely on remote sensing and inferential determinations of an information recipient's individual reaction to information being communicated to them to infer or derive the effectiveness of the content of the information. For example, the U.S. Pat. No. 6,873,710 uses a camera to identify specific behavior that is used to infer whether or not an audience is paying attention to the presented content, and whether, through the detection of smiling, they are reacting to the communicated information in a positive way. Using a video camera and audio capture device, the U.S. Pat. No. 6,873,710 assesses whether an individual is facing the communications display, changing body poses to face the display, changing body expressions (visual, tracking of body features), changing facial expression as the message is displayed (visual), suddenly becoming silent (audio level down), or starting to laugh/concentrate because of the content (audio change). U.S. Pat. No. 7,106,204 teaches using body language detectors for indirectly assessing a psychological state of individuals in order to tailor the content of information being provided to those individuals. Inferring or deriving a reaction by a recipient to information being communicated to them may be misleading, or outright inaccurate, in that the disclosed prior art inventions have no way of differentiating other sources of communication (or non-communicative stimuli) that may be attributing to an information recipient's state of being.

Direct measurements of physiological effects on information recipients are well known in the art. For example, pupils respond to visual stimuli and drug loads that affect central nervous system function, and may be monitored directly to assess important information about an information recipient's current biological state, as well as changes to that state. U.S. Application 2006/0252976 describes implantable devices for directly monitoring physiological changes in an organism. U.S. Application 2008/0140159 discloses use of implantable devices capable of sensing and recording various biological signals from the body, such as, for example, electrocardiogram (ECG) signals, where the internal implantable devices offer advantages over external sensing devices that have at least one electrode attached externally to the patient. The application states that internal implantable devices can provide a high degree of measurement sensitivity as they decrease the distance between the source of the signals and the sensing device. These highly sensitive measurements are recordable in the electronic components of the implantable device. Moreover, the FDA recently approved the use of implantable RFID tags in animals, which, when used in humans, can be used to transmit information about a tagged individual to a nearby RFID reader (interrogator).

Monitoring an organism, or a portion thereof, may provide key data about how the organism is reacting to external stimuli that are sensed by sense organs (i.e., organs for detecting sight, sounds, smells, etc.). An information recipient's blood pressure and the concentrations of certain blood chemicals or blood chemical indicators may be detected using implantable sensors that provide important data about the information recipient's state of being, and changes to that state. Prior art patents and patent applications disclose methods involving biometric sensors for detecting a physiological state or change of physiological state of a being and then, using the information, adjusting the presentation of information to the being. For example, U.S. Publication 20070066403 teaches an e-book device that branches a storyline transparently depending upon user biofeedback. For example, as the possibility of a murder increases in the storyline, the user's pulse may increase so quickly that the process determines that more descriptive lead-up information is warranted to allow for a steadier user state. However, those disclosures do not involve combining characteristics information about a plurality of individuals for purposes of targeting a communication to the individuals.

It should be apparent, therefore, that there exists a need for a system and method for actively, dynamically, and seamlessly updating and tailoring information that is being or will be communicated to information recipients who are directly or at least proximate a communications modality using predictive-type characteristics about the recipients such as geographic, demographic, psychographic, and behavioristic characteristics, and inferred, derived, and direct physiological characteristics, which are continuously or nearly continuously being monitored and evaluated.

SUMMARY AND OBJECTS OF THE INVENTION

It is a principal object of the present invention to provide a system and method for actively, dynamically and seamlessly updating and tailoring information to be delivered or provided to information recipients over any communications system based on one or more geographic, demographic, psychographic, behavioristic, biological, or other category of characteristics of one or several of the recipients that are continuously or nearly continuously being monitored and analyzed.

Because captive audiences provide an opportunity to communicate information with less risk of drop off, it is another object of the present invention to provide a system that is suited to communicating information to captive audiences, such as those waiting in a movie theater, using public transportation vehicles, and riding on elevators, standing in lines at amusement rides, to name a few.

In the United States, mobile phone adoption has grown to include more of the population than Internet users. The location of those mobile phones is constantly being monitored as a result of regulations implementing local and regional emergency response systems. Many of those mobile phones are also equipped with global navigation system capabilities, which allows them to be used for navigation purposes and pinpointing the location of the users. Thus, given the proliferation of mobile telephony devices, it is another object of the present invention to provide a system and method for communicating information to information recipients that takes advantage of the location information about those recipients using mobile phone technology.

Briefly described, these and other objects and features of the present invention are accomplished, as embodied and fully described herein, by a computer-implemented method for communicating information using at least one mode of communication by monitoring a plurality of information recipients within a pre-determined space and during a pre-determined time period; receiving characteristics information specific to each of the plurality of information recipients comprising a combination of at least one directly measured physiological state characteristic and at least one non-physiological state characteristic; selecting from a plurality of information elements at least one information element based on the received characteristics information; providing the at least one information element to a communications device proximate to the pre-determined space; and communicating the at least one information element in the pre-determined space. The computer-implemented method further includes directly measuring, using at least one sensor, the directly measured physiological state characteristic. In one embodiment, the pre-determined space is a public space and wherein the pre-determined time period is all or a portion of 24 hours, and some of the measured and other characteristic information is stored in a information recipient profile database.

The above and other objects and features of the present invention are also accomplished, as embodied and fully described herein, by a computer system for communicating information using at least one mode of communication that includes a communications device adapted to outputting information sensible by a plurality of information recipients; an information agent for receiving characteristic information specific to each of the plurality of information recipients within a pre-determined space and during a pre-determined time period, the characteristic information comprising a combination of at least one directly measured physiological state characteristic and at least one non-physiological state characteristic; at least one sensor within the pre-determined space for directly measuring the at least one directly measured physiological state characteristic and for providing the directly measured physiological state characteristic information to the information agent; and an information content generator for providing to the communications device a plurality of information elements selectable by the information agent based on the at least one directly measured physiological state characteristic and the at least one non-physiological state characteristic.

The communications system also may include at least one sensor for sensing at least one environmental condition, a communications device that includes audio and visual information, a memory device for storing the directly measured physiological state characteristic and the at least one non-physiological state characteristic, and a biometric sensor.

Another embodiment of the invention may include a computer system for tailoring information to be communicated using at least one mode of communication having a means for identifying a plurality of information recipients within a predetermined location; a plurality of fixed biometric sensors within the location for directly measuring at least one physiological state characteristic specific to some of the plurality of information recipients; an information recipient profile database comprising records comprising information about the measured physiological state characteristic and information about at least one non-physiological state characteristic specific to some of the plurality of information recipients; an information content generator for providing to an audio-visual communications device a plurality of information elements selectable by an information agent based on the at least one directly measured physiological state characteristic and the at least one non-physiological state characteristic.

With those and other objects, advantages, and features of the invention that may become hereinafter apparent, the nature of the invention may be more clearly understood by reference to the following detailed description of the invention, the appended claims and to the several drawings attached hereto.

BRIEF DESCRIPTION OF THE DRAWINGS

FIG. 5A is a drawing representing stored data records for each of a plurality of information recipients in accordance with one embodiment of the present invention;

FIG. 5B is a drawing representing additional stored data records for each of a plurality of information recipients in accordance with one embodiment of the present invention;

DETAILED DESCRIPTION OF THE PREFERRED EMBODIMENT

Figure 1:
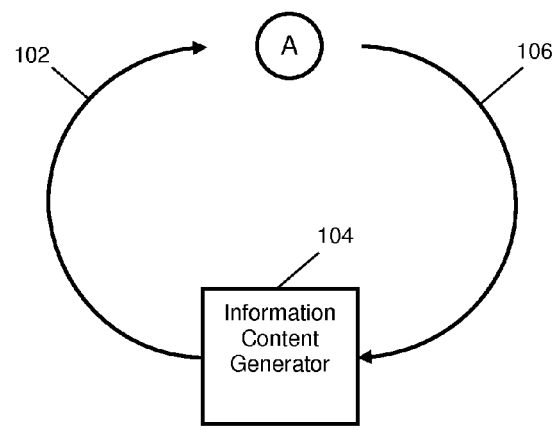
FIG. 1 is a schematic drawing of one aspect of the present invention.

Several preferred embodiments of the invention are described for illustrative purposes, it being understood that the invention may be embodied in other forms not specifically described below and/or shown in the drawings.

I. Overview

It is to be understood that the present invention may be implemented in various forms. For example, the invention may be embodied in hardware, software, firmware, special purpose computing devices, or a combination thereof. The present invention may be implemented in software as a program tangibly embodied on a program storage device. The program may be uploaded to, and executed by, a machine comprising any suitable architecture, either centrally executed or executed on distributed devices networked to each other. Preferably, the machine executing the program is implemented on a computer having hardware including one or more central processing units (CPU); one or more memory devices, such as a random access memory (RAM); and one or more input/output (I/O) interface devices, such as peripheral device interfaces. The computer may also include an operating system and microinstruction code. The various processes and functions described herein may either be part of the microinstruction code or part of the program (or combination thereof) which is executed via the operating system. In addition, various other peripheral devices may be connected or networked to the computer such as additional data storage devices, printing devices, and various sensors, including biological, environmental, and/or other sensors.

It is to be further understood that, because some of the constituent system components and method steps depicted in the accompanying figures are preferably implemented in software, the actual connections between the system components (or the process steps) may differ depending upon the manner in which the present invention is programmed.

Turning now to FIG. 1, shown therein is an overview of the present invention, which involves at least one individual information recipient A who receives a communication 102 containing targeted content from an information content generator 104 via any one of many known or future-developed communications modalities. The information recipient A may be described by various characteristics that reflect the information recipient's current state of being, such as the information recipient's mood, feelings, temperature, heart rate, etc. Some of those characteristics 106 may be outputted or outwardly exhibited or described through measurements, and which may reflect a response to the communication 102. The characteristics 106 help identify the past, present, or future (predicted) state of being of the information recipient. The characteristics 106 are then received by or input into the information content generator 104, which uses that information to adjust, if necessary, the targeted content in the communication 102. The invention, as noted previously, is intended to increase the effectiveness of the communication 102 by relying on the current characteristics 106 of the information recipient A, or other known or predicted characteristics information that may be updated on a continuous or nearly continuous basis.

The invention is equally effective where more than one information recipient receives the same communication 102, the content of which is adjusted based on characteristics of all or a segment of the information recipients. Because the invention is automated, it is necessary to identify individual information recipients to which the communication 102 is directed. For purposes of this description, information recipients may be one or more people, entities, and things, such as digital computing devices, or a combination of individuals and things. For purposes of illustrating the present invention, information recipients will be people or portable computing devices associated with and/or used by people.

II. Identification of Information Recipients

Figure 2:
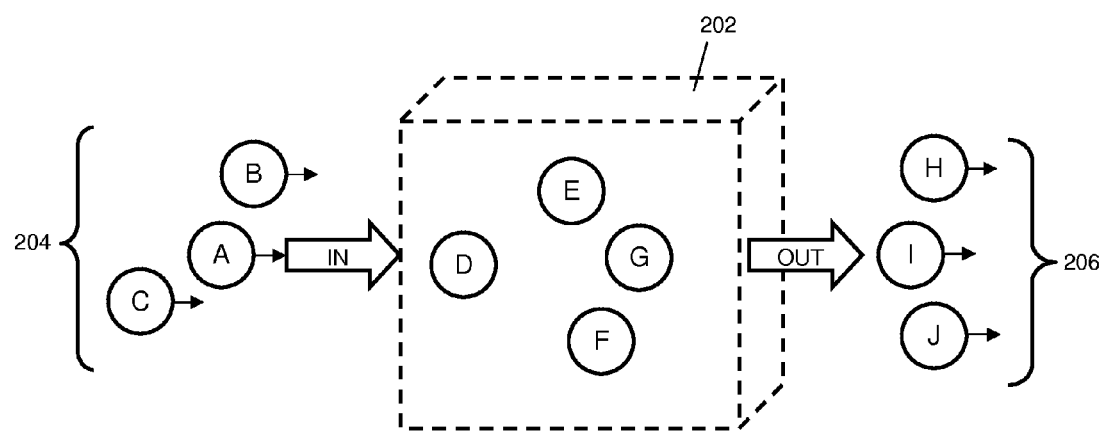
FIG. 2 is a schematic drawing of another aspect of the present invention.

Various means for monitoring a plurality of information recipients are now described. Monitoring includes the identification of individual information recipients dynamically to assess the influx, outflux, and presence of individuals, or their computing devices, within a specified three-dimensional space 202, as illustrated in FIG. 2. In FIG. 2, individual information recipients A, B, and C, or their associated computing devices (collectively identified as reference 204), are entering the space 202, while individual information recipients/devices H, I, and J (collectively reference 206) are exiting the space 202. Remaining present inside the space 202 are information recipients/devices D, E, F, and G.

FIG. 2 is a snapshot in time of what can be, in most cases, a very dynamic system in which recipients/devices are continuously or intermittently entering, exiting, and remaining within the space 202 over a given period of time.

The space 202 may be defined by a two-dimensional geographical area. A two-dimensional area, for purposes of this invention, is any place where one or more information recipients such as A, B, C, D, etc., receive information being communicated from the information content generator 104 using one or more communications modalities.

Figure 3:
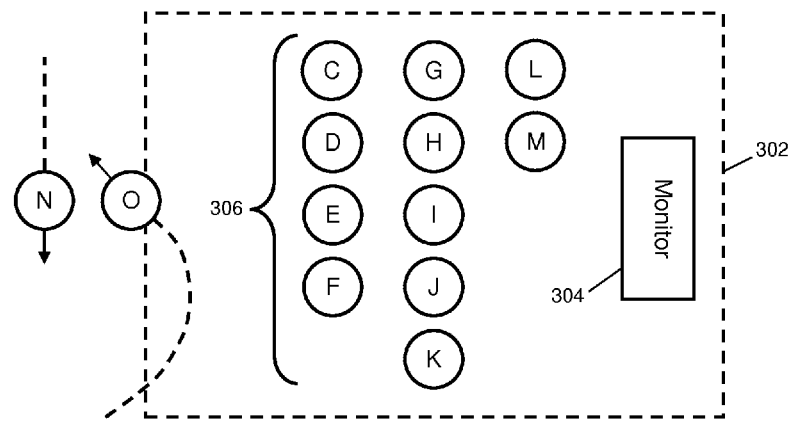
FIG. 3 is a schematic drawing of yet another aspect of the present invention.

Thus, as illustrated in FIG. 3, a location may be, for example, the geographic area 302 proximate to a television monitor 304 in an airport waiting area, which is defined, by its outer limit, by the point where individual information recipients C, D, E, . . . , and M (collectively identified as reference 306) in the geographic area 302, whom are presumably waiting to catch an airline flight in this particular scenario, can perceive the visual and/or audible output from the television monitor 304 (some may be watching the video-portion of the broadcast while others are only listening to the audio-portion of the broadcast). The visual and/or audible output from the television monitor 304 is synonymous with the communication 102 of FIG. 1, and the output contains broadcast signal content from a broadcast, satellite, or cable providers, which are synonymous with the information content generator 104 of FIG. 1.

A geographical area may also be, for example, the inside of an elevator equipped with a monitor that outputs a visual/audible communication 102. A geographical area may also be the inside of a public transportation vehicle (i.e., a bus or taxi) equipped with video and/or audio speakers. A geographical area may also be the inside of a public food or beverage establishment that has video and/or audio systems that are used to entertain or inform patrons. A geographical area may also be the inside a movie projection theater. A geographical area may also be a virtual location, such as a website, despite the fact that most of the individuals that visit the web site location are geographically disperse. A geographical area may also be a staging area, such as a rope line for an amusement ride. Essentially, any geographical area where multiple individuals or things can gather and be exposed to a communication 102 is within the scope of the present invention.

The influx, outflux, and presence of persons or things entering, leaving, or remaining in any given geographical area in accordance with the present invention can be determined, or generally assessed, in a number of ways. In a preferred embodiment of the invention, at least some of the information recipients entering, leaving, or remaining in a geographical area will possess a digital computing device that is equipped with an automatic location identifying (ALI) device, such as a global navigation positioning system-enabled client device. For example, today, many mobile phones are equipped with global positioning system (GPS) devices that allow their geographical coordinates to be pinpointed with certain accuracy (in Europe, Galileo is the equivalent of the US GPS system; there are other systems in use in other countries today as well). The geographical coordinates information is relayed from the information recipient's mobile phone to a base station, which then relays the information via the public switched telephone network (PSTN), or via a packet switched network (PSN) such as the Internet, to an owner or operator of the communications device being used at the geographical area where the information recipient is located. Thus, the system of the present invention is provided information relating to the influx, outflux, and presence of information recipients at the geographical area based on the information recipient's mobile computing device.

Alternatively, the approximate geographical area of a mobile device can be assessed using triangulation techniques, as follows. Mobile phones have a low-power transceiver that transmits voice and data, which can be detected by nearby cell towers. Once detected, the phone registers with the mobile telephone exchange, or switch, using a unique identifier that is correlated with a user profile. The phone and cell towers are constantly listening to each other to determine which cell site has the strongest signal. Based on the time it takes for the transmitted voice and data information from the phone to be received at the cell site towers, the approximate location of the mobile phone can be computed within certain accuracy.

Any kind of mobile telephony device that is equipped with an ALI-equipped device could be used with the present invention, including, but not limited to, a personal data assistant (PDA), a laptop computing device, a pager, etc.

In another embodiment of the invention, at least some of the persons entering, leaving, or remaining at a geographical area will possess a device that is equipped with a radio frequency identification (RFID) tag, which can be programmed to transmit a signal upon being interrogated by a nearly antenna package having a transceiver and decoder. The antenna package emits a signal activating the RFID tag so that it can read data from the tag. That information can be transmitted, as noted above, to an owner or operator who is made aware of the presence of the person entering, leaving, or remaining at the location near the owner's/operator's communications devices.

In still another embodiment of the invention, at least some of the information recipients entering, leaving, or remaining at a location will be assessed based on their anthropometric or biological characteristics. For example, the communications device at the location may be equipped with, or operatively connected to, an audio or video camera device that monitors individuals in the location around the communications device. The output of the device is used as input to a face-recognition software subsystem that evaluates characteristics of each individual at the location. Other anthropometric or biological characteristics that can be used to identify individuals at a location include fingerprints, retinal scans, DNA assays, breath analyzers, audio samples, and others. For example, some establishments require the use of fingerprint scans, which can be correlated with a database of user profiles to identify the presence of a person at the geographical area of the establishment. The biological characteristics information may be embodied in barcode form, such as on an airline ticket (e.g., personal information about the information recipient), or stored as electronic information (e.g., audio voice samples).

In still another embodiment of the invention, at least some of the information recipients entering, leaving, or remaining at a geographical area may be assessed based on information contained in one or more personal identification-enabled client devices. Those devices could include, but are not limited to, personal credit cards equipped with identification and authentication data embedded in the device. Those integrated circuits have embedded personal information about the owner that can be read and analyzed once a card is swiped through a card reader. Alternatively, the personal information that is obtained from the device may be subsequently transferred to a second device, such as a barcode on an admission or boarding ticket, which can then be read by a second device. Thus, information about the information recipients may be obtained and then transmitted, as noted above, to an owner or operator of a communications device who is then made aware of the presence of the information recipients entering, leaving, or remaining at the geographical area near his communications device.

In still another embodiment of the invention, at least some of the information recipients entering, leaving, or remaining at the geographical area can be assessed using any type of input/output device associated with a digital computing device in which one or more of the information recipients entering, leaving, or remaining at the geographical area enters an alphanumeric code or sequence of codes into the digital computing device, or has someone else enter the code(s) for them. For example, a PDA or mobile phone, equipped with a keypad or voice recognition microphone, may be used by individual information recipients to identify themselves and their location to an owner or operator of a communications device who is then made aware of the presence of the information recipients entering, leaving, or remaining at the geographical area near the communications devices.

In still another embodiment of the invention, at least some of the information recipients entering, leaving, or remaining at a geographical area can be assessed using a cable television system cable box. Also, a web site session cookie may also be used to assess the presence of an information recipient.

In still another embodiment of the invention, at least some of the information recipients entering, leaving, or remaining at a geographical area can be assessed using indirect methods. For example, one or more information recipients may personally enter or somehow upload an itinerary in a web or desktop calendaring program application running on a network computer that outlines when and where an information recipient is to be located at any given time period. The itinerary information may uploaded over the network to an owner or operator of a communications device who is then made aware of the potential presence of the information recipients entering, leaving, or remaining at the geographical area near the communications devices. Alternatively, the itinerary information may be mined by a separate program that collects the information of one or more information recipients and transmits it to the owner/operator of the communications devices.

In still another embodiment of the invention, at least some of the information recipients entering, leaving, or remaining at a geographical area may be assessed using user-entered preferences stored in a user profile on a networked computer. The profile may include information about an individual's travel or commuting routine, which can be transmitted to an owner or operator of a communications device who is then made aware of the potential presence of the information recipients entering, leaving, or remaining at the location near the communications devices.

In still another embodiment of the invention, the location of at least some of the information recipients may be predicted based on previous location information for information recipients, known destinations for the information recipients, the time of day, environmental factors, travel itinerary information, and other data that may be processed to estimate locations.

Thus, referring to FIG. 3 again, the presence of information recipients C, D, E, and F in the geographical area 302 may be established based on a signal sent by those information recipients' respective mobile computing devices that are equipped with an ALI-equipped device, or may be established using triangulation methods described above, or may be established using any one or a combination of the other techniques described above, or other techniques not specifically mentioned.

On the other hand, monitoring the presence of information recipients G, H, and I, for example, in FIG. 3 may be assessed based on their credit card ticket purchases and subsequent identification at the airport by a biometric sensor (e.g., fingerprint scan) or scanning a bar code boarding pass that includes personal identifying information. The system of the present invention would include a database of or access to information about the gate where the ticketed passenger is to be located prior to the boarding time. Based on that information, the system may assume that at least one of those ticketed passengers G, H, and I are proximate to the television monitor 304 at a time period prior to the plane's departure time.

On the other hand, monitoring the presence of information recipients J and K, for example, may be obtained by mining each information recipients' itinerary information which could be used to establish the approximate time the person is to be present in the area 302. In addition, individual K may have affirmatively provided his or her location information to the system of the present invention by entering that information into a computing device that is operatively connected to the system of the present invention, which system can then utilize that information as needed.

Finally, monitoring the presence of information recipients L and M in the area 302 may be assessed based on a remote scanning or interrogation device coupled with face recognition software, such as a video surveillance and detection system set up to scan the immediate area around the television monitor 304.

In sum, with respect to FIG. 3, the system and method of the present invention is able to obtain very specific identifying information about at least some of the individual information recipients present within the area 302, or it may have basic information about some of the other information recipients, such as whether the individual is, for example, a man or woman and whether he or she is tall or short, or exhibits other characteristics.

Whatever technique is used to assess the information recipients entering, leaving or remaining at a geographical area, it must take into account the fact that information recipients may be located near the fringe or edge of a two-dimensional location but who may not be, or should not be, part of the segment of information recipients that are receiving information from a communication device at that location because they are not interested in receiving the information. For example, as shown in FIG. 3, in an airport waiting area 302 where information recipients C, D, E, . . . , and M are sitting near a television monitor 304, individual N may walk by the waiting area 302 on his way to a different gate or airport location, and individual O may pause near the area 302 to check an information display device that might be located nearby. The paths of individuals N and O are illustrated in FIG. 3 by broken lines; the arrows suggest the direction those individuals are headed. Thus, those individuals are identified as not being interested in receiving the information from the television monitor 304.

Because the accuracy of ALI-equipped devices and other techniques for identifying an information recipients' location may not provide the necessary resolution to accurately include or exclude individuals on the fringes of a geographical area, it is contemplated that the system of the present invention may differentiate between those individuals using various alternative techniques. One such technique is to rely on the amount of time an information recipient remains at a given location. Also, given the limitations of the location-identifying techniques described above, the system and method of the present invention may presume that an individual is located near more than one communications device, especially if there are two communications devices relatively close to each other, such as two television monitors at adjacent airport gates, or two screens at adjacent movie theaters.

As described above, there are many techniques involving various hardware and software devices in which an individual's location can be detected or assessed near one or more communications devices according to the present invention. The specific technique for determining the influx, outflux, and presence of individuals/devices at a given geographical area, whether the technique exists today and is described above, or has not been developed and is not mentioned herein, is not important. What is important is obtaining information about the individuals near a communications device, because each of those individuals, plus others that cannot be determined or assessed but that are near the communications device anyway, are potential information recipients.

III. Identification of Characteristics of Information Recipients

As noted previously, for the communication of information from one person to another to be effective, it must be accurate, clear, concise, coherent, and, most importantly, appropriate to the person receiving the information. The person communicating the information may control whether the information satisfies those criteria. The appropriateness of the information, for example, may be assessed once characteristics of the information recipient or group of information recipients are known. Thus, another aspect of the present invention involves the assessment of individual information recipients at a given location.

Figure 4:
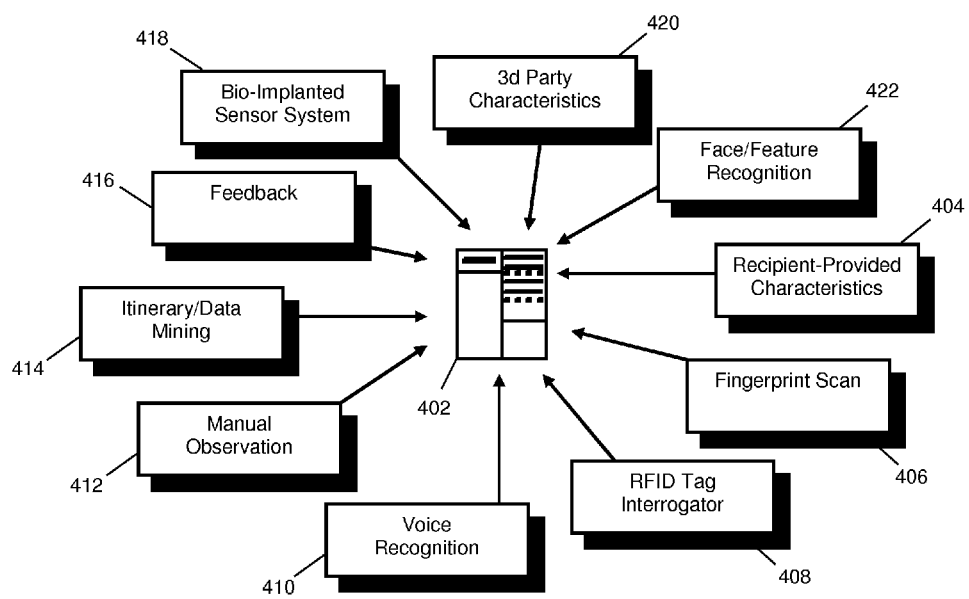
FIG. 4 is a block and schematic drawing of still another aspect of the present invention showing various informational input sources.

Means for monitoring a plurality of information recipients as shown in FIG. 4, which is a drawing of a networked computing device 402, which may actually be several distributed or centralized networked computers or servers operating in, for example, a packet-switched network environment. The computing device 402 receives characteristics 106 directly or indirectly from information recipients, information which is then used to tailor or target the communication 102. The computing device 402 may be linked with a storage device (not shown), which may include several distributed storage devices operatively connected to each other or to each of the several networked computers or servers. Preferably, the storage device(s) is/are used to maintain one or more databases, spreadsheets, or other electronic files described previously. The computing device 402 will be described in more detail below.

As shown in FIG. 4, information about information recipients may be received at the computing device 402 as recipient-provided characteristics 404, fingerprint scans 406, information embedded in radio-frequency identification tags 408, audio (voice) information 410, manual observations 412, information mined from sources such as schedule/itinerary programs 414, feedback provided by one or more information sources 416, biometric sensors implanted in one or more information recipients 418, information obtained from third-party information providers as third-party characteristics 420, and face recognition devices and associated face recognition software 422, among others. Some of the information may be measured remotely or directly using various devices and techniques, observed, and estimated or predicted from or based on existing characteristics data previously stored, which may be default data.

Characteristics Provided by Third Parties.

Third parties may obtain and then provide individual and aggregated geographic, demographic, psychographic, and behavioristic characteristics (or information that may be classified under some other classification schema) from online and offline purchase data sources, among other sources. Those information sources typically mine for data from white pages listings, various public and private financial records, supermarket purchase savings cards, product sponsored surveys, sweepstakes and other contest entries, home ownership or other public property records, U.S. Census records, motor vehicle registration data, automatic number information, credit card transactions, telephone activity records, credit history records, product warranty cards, sales of magazine and catalog subscriptions, and many other public and/or publicly-accessible (i.e., fee-based) records.

The following information is typically available from various third-party data miners about individual information recipients: Social Security Number, shopping preferences, health- or medical-related information, marital status, financial situation (i.e., solvency, creditworthiness, existing and past loan amounts, and the number and type of credit cards owned), date of birth, gender, age, approximate household income, race and ethnicity, geographical locale, physical characteristics (i.e., height and weight), household occupants (i.e., whether an individual has children), telephone numbers, utility usage (e.g., electric or gas usage, telephone usage, cable or satellite usage, Internet subscription, celluar phone usage), magazine subscriptions, occupation, level of education, whether an individual is likely to respond to "money-making opportunities," the individual's congressional district, size of clothes worn, habits (e.g., smoking), arrest records, lifestyle preferences, hobbies (i.e., whether and what the individual collects), religion (i.e., affiliation and denomination), homeownership, characteristics of residence (e.g., size, number of bedrooms and bathrooms, sale price, rent and mortgage payments), type of automobile owned, characteristics of automobile owned (i.e., year, make, value, fuel type, number of cylinders, presence of vanity or special membership plates), whether the individual responds to direct mail solicitations, contributions to political, religious, and charitable groups, membership in book, video, tape, and compact disk clubs, mail order purchases and type, product ownership (i.e., beeper, contact lenses, electronics, fitness equipment, recreational equipment), pet ownership and type, interests (e.g., including gambling, arts, antiques, astrology), book preferences, music preferences, and "socialites" perspective.

Characteristics Self-Reported by Information Recipients.

Information recipient-provided information may also be assessed using personal information and preferences identified by, or supplied by, one or more of the information recipients themselves. The personal information and preferences may be stored electronically in, for example, a database or spreadsheet, or in a collection of individual files indexed in a database. The personal information and preferences may include geographic, demographic, psychographic and behavioristic characteristics, as previously described. Types of preferences may include, by are not limited to, the preferred duration of a communication (i.e., the length of time the individual is interested in hearing about an advertisement for a automobile), a preference for whether a man or woman delivers the communication (i.e., as a voice over narrator, or anchor-person), whether the information recipient is gender-centric, the preferred tone or voice quality of the communicator, which the language the communication uses (i.e., Spanish, German, English), and other preferences. Thus, an assessment of any particular information recipient, or an assessment of a plurality of information recipients, at a given location, may be done by simply mining the electronic personal information and preferences information of those information recipients.

Characteristics Extrapolated From Third-Party Sources.

In addition to third-party and recipient-provided information, general characteristic information, such as census data or other third-party data, may be used to characterize information recipients, and may be used to predict or estimate other characteristic information if that other characteristic information is not available from the third-party sources or provided by the individual information recipients themselves. For example, predicting whether an information recipient is pre-disposed to hearing about home remodeling information (i.e., buying habits characteristics) may be determined by mining third-party information about an information recipient's home value, home location, length of time owning the home, and estimated household income.

Characteristics From Biometric Sensors.

Various biometric sensing devices may be used to identify characteristics about information recipients located at a geographic area. Sensors may be classified generally as remote, proximate, or implantable. Remote and proximate sensors may include, but are not limited to, video cameras that detect body language, facial features (e.g., smiling), height, body shape, head position, blinking rate, pupil dilation, and other external physical characteristics. Remote sensors may also include infrared sensors that detect infrared energy emitting from information recipients. Proximate sensors may, but are not limited to, include skin biosensors that detect transpiration and tension in skin segments of information recipients, retinal scanners, finger print analyzers, and breath and voice detection analyzers. Bio-implanted sensors may include, but are not limited to, pace makers, nano blood flow, pressure, temperature, glucose content, and oxygen content sensors, radio-frequency transceivers, and acoustic wave sensors that measure sound waves propagating through bodily structures. Implantable devices may be wired (lead) or wireless (leadless), miniature, batteryless or internally powered, and include a transceiver or telemetric device for communicating characteristics information to an external data receiving and transmitting device, which may include a mobile hand-held computing device (including a mobile telephony device).

Characteristics from Feedback.

Feedback received through various communications channels from or on behalf of an information recipient is another technique for assessing individual characteristics of information recipients. For example, information recipients that describe their emotional response to a communication from an information provider via one or more communications devices may provide the information provider with valuable information about the impact of the content of the information that is being provided, which may be used to fine-tune the content. Feedback may be written, provided orally, provided or derived from responses to survey questions, and it may be collected and processed in real-time or delayed for a period of time.

Characteristics from Manual Observations.

Manual observations may also provide valuable characteristics information about one or more information recipients. Manual information may be collected by individual observers and transmitted orally or entered manually into a computing device and relayed to the computing device 402.

Turning now to FIGS. 5A and 5B, shown therein is a table, spreadsheet, set of database records, or other recorded or written characteristics information 500 containing information about several information recipients, A, B, C, . . . , and M, that have been determined to be present at a given geographical area at a specified time, or during a specified period of time. For each information recipient that can be identified at the geographic location, one or more databases, such as SQL or DBMS databases, spreadsheet files, or other electronic format files are searched to locate the individual's personal profile information, if it exists, which may contain recipient-provided characteristics information 502, user preferences, such as the types of music, coupons, shopping location, etc., the information recipient is interested in. For example, the profile for information recipient A may contain a record of his age (i.e., 21 years old), his annual income ($62,200 per year), and whether or not he is married (i.e., "Y," meaning "Yes"). Of course, the profile may contain many other information points for many other variables not shown in FIG. 5A. One of ordinary skill in the art will appreciate that not all of the information 500 is required to be located on a single computing device or database, but may instead be distributed over multiple networked computing devices and databases, and on third party computers or databases.

Moreover, in addition to the individual's profile information, databases, spreadsheet files, or other electronic format files may be searched to locate records of other characteristics information related to information recipient A that may have been provided by, delivered from, or is otherwise available from a third-party-provided characteristics 504 sources. For example, as shown in FIG. 5A, the third party-provided characteristics information may include a record of information recipient A's spending index (i.e., 0.8), if he is a home owner (i.e., "Y," meaning "Yes"), and which political party he is affiliated with (i.e., "1," which may correlate to the Democratic Party, the Republican Party, the Labour Party, or some other political affiliation). Of course, the third-party-provided characteristics information may include many other information points for many other variables not shown in FIG. 5A.

Moreover, in addition to the individual's profile information and third-party-provided information, additional or supplemental general characteristic information may be extracted or computed from government census data, other third-party data sources, or other source that may be used to estimate or predict characteristics 506. In other words, if information about past buying habits, price avoidance, and FICO credit rating score, for example, are not available for a potential information recipient, those values may be obtained from, for example, historical information associated with individuals having similar characteristics as the information recipient that is missing that information, and from statistical averages or calculated mean data for similar individuals. Thus, for example, in FIG. 5A, the records 500 for information recipient A may include past buying habits records (i.e., "15-14-2"), a price avoidance index (i.e., "0.72"), and a credit worthiness score (i.e., 650), which are computed from statistical averages of several hundred individuals with similar annual incomes as information recipient A.

In addition to the recipient-provided characteristics information 502, third-party-provided characteristics 504, and estimate or predict characteristics 506 shown in FIG. 5A, a table, spreadsheet, set of database records, or other recorded or written characteristics information 500 may further include directly measured or sensed physiological state information about information recipients, A, B, C, . . . , and M, that have been determined to be present at a given geographical area at a specified time, or during a specified period of time. For each information recipient that can be identified at the geographic location, the one or more databases, such as SQL or DBMS databases, spreadsheet files, or other electronic format files are searched to locate the individual's personal profile information, if it exists, which may further contain information about the information recipient's relative head position 508 (i.e., up or down), present relative motion 510 (i.e., compared to a fixed location, such as moving left or right of a fixed communication device 304), distal pulse rate 512, skin temperature 514, change in oxygen content 516, weight 518, level of audio/sound from the individual 520, a blood content index 522 (i.e., a weighted average of various measured parameters), and systolic blood pressure 524. Other physiological state characteristics information that may also be available include facial characteristics, height, blinking rate, pupil dilation, skin tension, limb movement frequency, breath chemical composition, and cardioelectrical signals, to name a few. Environmental state characteristics information may also be included, such as air temperature, pressure, humidity, time of day, and declination/angle of sun, to name a few.

Figures 6, 7:
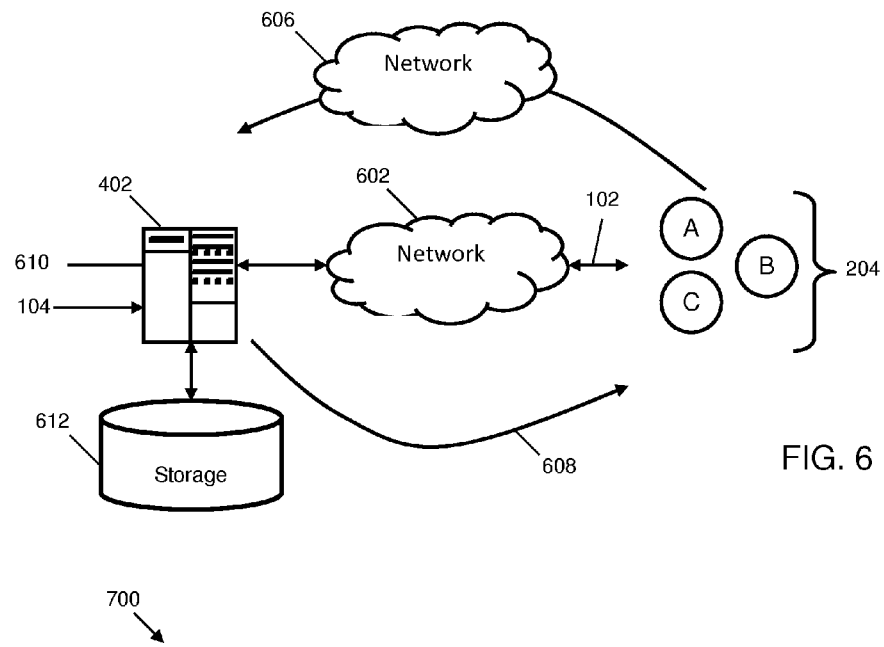
FIG. 6 is a schematic drawing of yet another aspect of the present invention showing one network configuration embodiment.
FIG. 7 is a drawing representing data records stored in accordance with one embodiment of the present invention.

As indicated above, individual information recipients may provide feedback to the system of the present invention, as illustrated in FIG. 6, which may be sensed physiological state information, and information provided orally or otherwise. That information may then be used to tailor, on a real-time or near-real-time basis, either continuously or semi-continuously, the information being communicated to the information recipients. The computing device 402 of FIG. 4 is now shown connected to a network 602, such as the Internet, in order to provide or deliver a communication 102 to information recipients A, B, and C (or their computing devices) (collectively 204). The communication 102 may be provided to the information recipients 204 via one or more communications modalities, including devices such as a television 304, which output information developed by the information content generator 104. The term "provided" is to refer to transmission of the communication 102 and may include, but is not limited to being delivered, made available, pushed, pulled, uploaded, downloaded, conveyed electronically by wire or wireless modes, or otherwise outputted. The feedback provided by those information recipients 204 may be sent directly back to the computing device 402 through the network 602 or a second network 606 (or both, or any number of networks). A separate output signal 608 may be communicated by the computing device 402 directly to the information recipients 204 either before or after the communication 102 is received.

The computing device 402 includes a software subsystem running a software application called, for purposes of this discussion and not to limit the structure and function of the subsystem, an information agent 610. The information agent's 610 various functions include controlling the receipt and storage of data in the database 612, interfacing with the information content generator 104 to develop and produce and output information content (e.g., multi-media content) that forms the communication 102, and the communication of the information to the information recipients 204. The information agent 610 also manages functions such as invoice production, accounts receivable, intake of information and data from the boxes shown in FIG. 4, recipient preferences, establishment of information recipient profiles, information recipient biometric information (e.g., fingerprint and retinal mapping data), and other information recipient-interface operations.

The information agent 610 may operate on a single networked computer 402, or on a plurality of distributed networked computers co-located at the same or different facilities. The computing device 402 is adapted to, among other things, receiving, storing, formatting, indexing, encoding, extracting, comparing, processing and/or compiling information from various sources, as noted above; as well as transferring that information to the database 612 (or other databases, spreadsheets, tables, etc.) associated with the information agent 610; monitoring preferences of the information recipients 204; and directly or indirectly communicating the information that is stored in the database 612 via one of the several communications modes noted previously and described below.

Once the information recipients are identified at a given location and their individual and collective characteristics have been detected, determined, calculated, or otherwise assessed and inputted to the information agent 610 (or are being assessed on a continuous, dynamic basis) as described above, the owners or operators of communications devices, through operation of the information agent 610, continuously and in real-time (or at least near real-time) selects the information and/or data to be delivered or provided to the information recipients as the content of the communication 102. The selection of appropriate information may initially be based on preferences supplied by one or more of the information recipients. Thus, until enough information about the various characteristics of the information recipients allows one or more characteristics about a segment of the information recipients to emerge, the information being provided or delivered may be driven primarily by preferences information or historical (i.e., baseline or default) information about the types of information recipients likely to be present at the location.

The process of developing content for the communication 102 is further illustrated in FIG. 7. As noted previously, segmentation is a technique often employed to group individuals having similar characteristics in order to target information to those individuals. Thus, the information agent 610 may be used to assess the various segments and store that assessed information in a database 700 (or spreadsheet, table, individual files, other compilations, etc.). The database 700 (which may be stored as part of or separately from database 612) may also include the characteristics information 500. One of ordinary skill in the art will appreciate there are myriad segments that could be used to group information recipients, as well as many different criteria used to select individuals for each segment.

In FIG. 7, each of the information recipients A, B, C, . . . , and M are assigned to a known segment 702 based on existing, historical, default, pre-determined, or user-provided, and sensed characteristics. Thus, for example, information recipient C may be designated for segment 16, along with other information recipients having the same characteristics or falling within a range of criteria (i.e., same salary range, age range, spending habits, residence state, marital status, job classification, etc.). An average "known segment" score may be calculated for the entire group or segment (in this case, FIG. 7 shows the average value is "6" for a group).

At any given date/time 704, a new assessed segment 706 may be calculated for each information recipient based on the same criteria used to assign information recipients to the known segments, or different criteria may be used that reflect updated societal values, purchasing influences information, revised marketing approaches, feedback from the information recipients, sensed physiological characteristics information, or other criteria or information received by the information agent 610. Thus, information recipient C might be assessed as a segment "15" at specific date/time 704, which is different than the segment information recipient C was previously assigned to (i.e., "16"). An average "assessed segment" score may be calculated (in this case, FIG. 7 shows the average value is "5.2").

The above segmentation scoring technique is used to convert subjective and objective characteristics information into an objective numerical score that can be used in many different kinds of algorithms to select the best information to be developed into content that is ultimately communicated to the information recipients. Some very simplistic, non-limiting algorithms illustrated in FIG. 7 are described as follows.

Consider, for example, the communication of a static impression to the information recipients A, B, C, . . . , and M, such as static impression SI1 and/or SI2 (only two are shown for illustrative purposes). Based on information recipient A's segment score, it might be determined that s/he would be receptive or responsive to a static impression, SI, which might be an advertisement for a new truck, that is shown during time period "1" (which can be any optimal time designated by the owner or operator of the communications device or the content provider). Thus, the information agent 610 would store in the database the value "Y1" in the SI1 variable.

Similarly, based on information recipient C's segment score, it might be determined that s/he would be receptive or responsive to SI2 (which might be an advertisement for a clothing sale) that is shown during time period "3." Thus, the information agent 610 would store in the database the value "Y3" in the SI2 variable.

To effectively communicate information to the collective group of information recipients A, B, C, . . . , and M, however, it is also of interest to understand how the entire segment is scored with regard to each available static impression, which may be pre-stored in a database, or created in real or near real-time. Thus, it may be determined that the entire segment should be shown SI1 (i.e., the value "Y1" is stored in the static impression SI1 variable). That value is shown in FIG. 7 as reference number 708 at the bottom of the table. Any kind of suitable algorithm could be used to reach that conclusion. For example, each individual value associated with each information recipient could be counted and a histogram created. The value that is the most frequently used (i.e., the mode) could be selected for variable 708 as shown in FIG. 7 (i.e, "Y1"). The same technique could be used to determine that the most frequently occurring value for static impression SI2 is "N" (i.e., the static impression is not suitable for most of the information recipients and is, therefore, not communication to any of those information recipients, at least during the period of time relevant to the computation).

The same technique (or other techniques involving different algorithms) may be used to determine that the collective group of information recipients A, B, C, . . . , and M should be presented with broadcast advertisement BA2 (reference 714 in FIG. 7), but not broadcast advertisement BA1 (see reference 712). In the case of a script of advertisements for a movie theater, the same technique (or other techniques) may be used to determine that the collective group of information recipients A, B, C, . . . , and M should be presented with both scripts AS1 and AS2 (references 716 and 718), which could be communicated sequentially in any order.

The process described above for segmenting recipients and then assessing the content of the communication 102 to be communicated to those information recipients is preferably dynamic. To further explain, suppose information recipient C is initially assessed a segment score of "15" based on recipient-provided characteristics information 502 (e.g., age, income, marital status), third-party-provided characteristics information 504 (e.g., spending habits, home ownership, political party), and estimated or predicted characteristics information 506 (e.g., buying habits, price avoidance index, and credit worthiness rating). Then, as sensed physiological state characteristics information is received as feedback, by way of, for example, network 602, and other feedback information is received, by way of, for example, network 606, the assigned segment score may be updated to a new segment number, and consequently, the information agent 610 may determine that the information recipients having the same segment score should be shown static impression SI2 instead of SI1. This may be due to the fact that most of the information recipients in the same segment are exhibiting physiological characteristics that suggest the communication is not being understood, or of any interest, or is otherwise inappropriate to the information recipients. This determination is made by the information agent 610 using a set of program criteria provided by a system administrator. For example, the criteria that may indicate no or little response to a communication 102 include pulse unchanged, head position down, no audible expression, and little or no physical movement.

Of course, the information in the database shown in FIG. 7 reflects a snapshot in time of the collective group of information recipients A, B, C, . . . , and M and may change during each subsequent calculation. For purposes of this discussion, the records in the database in FIG. 7 may be updated continuously or semi-continuously in real-time or near real-time, every five minutes, every ten minutes, every thirty minutes, every time new information about a characteristic is received, etc. The appropriate update time may be determine by the nature of the information being communicated, the location of the information recipients, the type of communications device being used to deliver or provide the information, limitations of the software and hardware, limitations on the availability of location-based information, and other considerations.

Those skilled in the art will appreciate that there are many ways to assess the overall characteristics of individuals and groups of individuals that differ from the techniques just described.

Another aspect of the present invention is a technique for developing, creating, and compiling a continuous stream or packets of information that may be delivered or provided to the information recipients via one or more of the communications devices or modalities of communicating information previously described. For example, as noted above and shown in FIG. 7, the system and method of the present invention may determine that the broadcast advertisement BA2 should be presented to the information recipients. Thus, that advertisement, which may be, for example, a fifteen-second commercial for a popular restaurant chain, needs to be delivered to the communications device where the information recipients are located and seamlessly interjected into the stream of broadcast content that is being provided at that moment (or cued to be provided during a future pre-determined time period). For example, referring to FIG. 2 again, information recipients A, B, C, . . . , and M may be near a television monitor 304 that is presenting a broadcast of a popular national cable news show which includes national headline, weather, sports, and popular culture segments separated by blocks of advertisements. The system and method of the present invention would, either remotely or at the communications device (or at many different locations using one or more networked computing devices), receive, assemble and compile a new script of broadcast information that includes the broadcast advertisement 712, 714.

Figure 8:
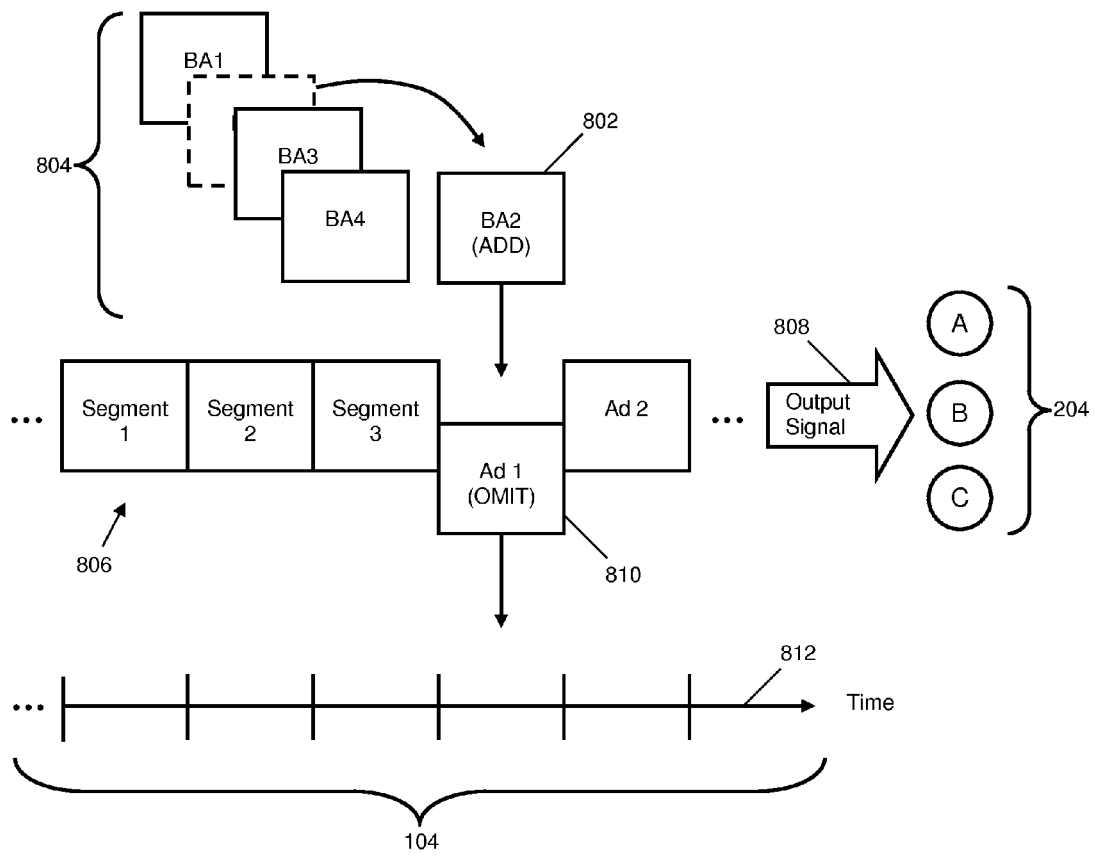
FIG. 8 is a schematic drawing of still another aspect of the present invention.

Turning now to FIG. 8, shown therein is a diagram of the information content generator 104 software subsystem in which a discrete element of information 802 is selected, by the information agent 610, from among a plurality of discrete information elements 804 based on the characteristics of one or more information recipients. Thus, information 802 may be broadcasting or scheduled to broadcast elements BA1 or BA2 as shown in FIG. 7, or a portion of BA1 or BA2 or some other or combination of broadcast elements. An existing script of information 806, which is being provided or delivered to information recipients A, B, and C (collectively 204) via an output signal 808 (generated by any one of the several communications modes identified herein), is identified. In this case, the information element 810 (i.e., Advertisement 1 or "Ad 1") is replaced by the information element 802, and then the script of information 806 is dynamically re-encoded and re-compiled to create a new script of information 806 that can be communicated to the information recipients 204 in the proper time sequence as illustrated by the time-line 812. Each segment of the script of information 806 may be, for example, a discrete electronic file, such as an MP3 format audio file, a multimedia data file, or information file that does not contain audio or video (e.g., a static impression containing advertising or entertaining information).

The information content generator 104 may be executed on the computing device 402, or it may be executed on a communications device, such as television 304, or both.

The database 612 includes records or files containing the static impression SI1, static impression SI2, broadcast advertisement BA1, broadcast advertisement BA2, scripts AS1, and script AS2 (among many other discrete pieces of information that are typically stored as digital files in the database 612). Once it is determined that the information recipients 204 should be shown at least broadcast advertisement BA2, that advertisement is inserted into an existing script of information 806 so that the information recipients may sense it (i.e., see or observe, hear, feel, etc.). The above technique of re-encoding and re-compiling may be accomplished by the information agent 610 at the computing device 402 or at the communications device (e.g., television) 304, or at both locations (the location does not matter, but it may be preferable to have the computing processing done at the server side if the communication device being used to provide or deliver the information has limited computing and memory capability).

Figure 9:
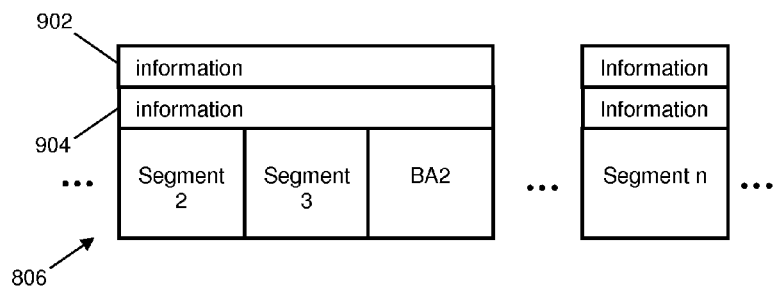
FIG. 9 is a schematic drawing showing an encoded script of information elements or segments.

The above processing sequence may be result in, as illustrated in FIG. 9, several discrete information elements of a broadcast and a new broadcast advertisement BA2, resulting in the assembled content elements in the correct order, which may be encoded with one or more headers 902, 904 that contains information about the individual information elements and other information. The information elements may be selected from the set of information elements 804 as well as local information elements (which may contain information of interest about to the location of the information recipients, such as local weather, news and sports).

Figure 10:
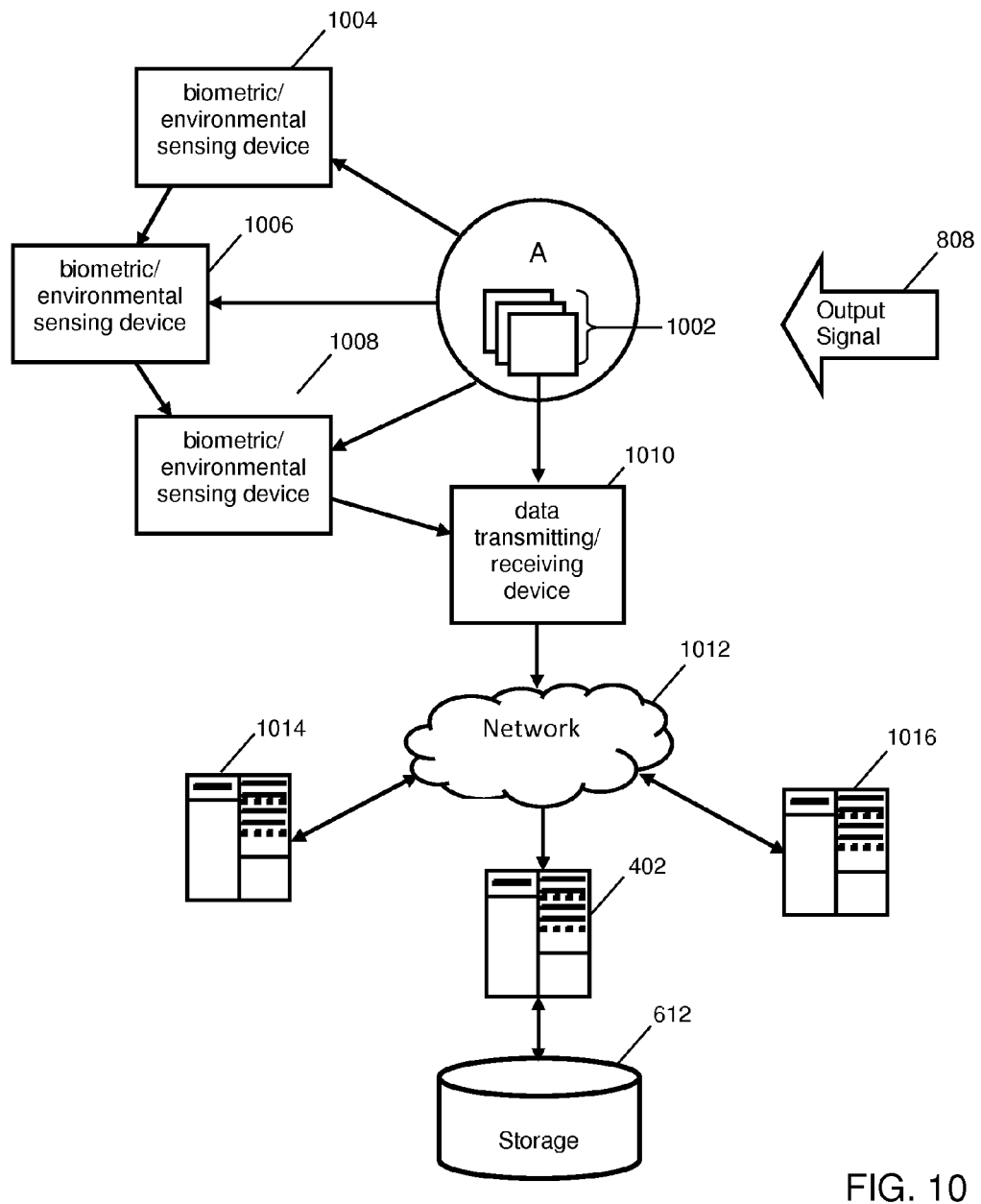
FIG. 10 is a schematic drawing showing network, data storage, and information input features of one embodiment of the present invention.

Turning now to FIG. 10, shown therein is block and schematic diagram of the system in which the biological state of the information recipient A, as well as changes to that state, are monitored using biometric and environmental sensing devices 1002, 1004, 1006, and 1008, which may be implanted in, on, or remote from the physiological mechanism of the information recipient's body that is being sensed.

The biometric sensing devices 1002, which are shown implanted in or on the information recipient A, are used to measure physiological changes to the biological state of the information recipient before, during, and after the information recipient A senses the output signal 808 (which assumes that the output signal 808 is sensible by the information recipient A). The biometric and environmental sensing devices 1004, 1006, and 1008 are also used to measure physiological changes to the biological state of the information recipient before, during, and after the information recipient A senses the output signal 808, but may also measure the environmental conditions in which the information recipient A is exposed.

All of the biometric sensors may be connected to each other, and to an external transceiver or telemetric device for communicating the measured physiological characteristics information of the information recipient A, or the environmental conditions, to an external data receiving and transmitting device 1010, which may be, for example, a mobile wireless computing/communicating device connected via a network 1012 to the computing devices 402 and database 612.

Each one of the biometric and/or environmental sensing devices 1004, 1006, and 1008 may be attached to or integral with an article worn by the information recipient A, which allows the device to be positioned where it can sense characteristics information of the information recipient A, such as pupil response, eye movement, blinking rate, heart rate (pulse), respiration rate, extremity movement/agitation, skin tension, blood oxygen concentration, breath component concentrations, smiling, etc. Each one of the biometric and/or environmental sensing devices 1004, 1006, and 1008 may also be positioned on an article of furniture, such as a chair, reading lamp, writing instrument, table top, mobile phone, wall, floor, cushion, etc., near the information recipient A to measure characteristics information of the information recipient A, or environmental conditions, or both.

The computing device 402 and database 612 store information and data associated with each of the sensing devices 1002, 1004, 1006, and 1008, as collected and transmitted via the external data receiving and transmitting device 1010. Because the signals may be in different formats, the data transmitted to the computing device 402 may need to be translated and encoded into a common format if such common formatting is desired. The data may also need to be encoded to permit transmission via the network 1012.

The database 612 may be a relational database, and may include a database management system, as well as a graphical user interface for administrative and customer access to the information being collected and stored in the database 612. For privacy reasons, access to the raw incoming and/or encoded and stored data records, and any personal identifying information associated with the data, may be blocked from being stored and/or accessed by customers, especially if the information is regulated under HIPAA, or if the information recipient A is a minor, and for other applicable regulatory compliance reasons.

Other characteristics information associated with the information recipient A may be stored on and downloaded from third-party data providers, typically for a fee. The characteristics information may be maintained on remote networked servers 914, 916, and downloaded automatically via network 912 or some separate network (not shown).

Figure 11A:
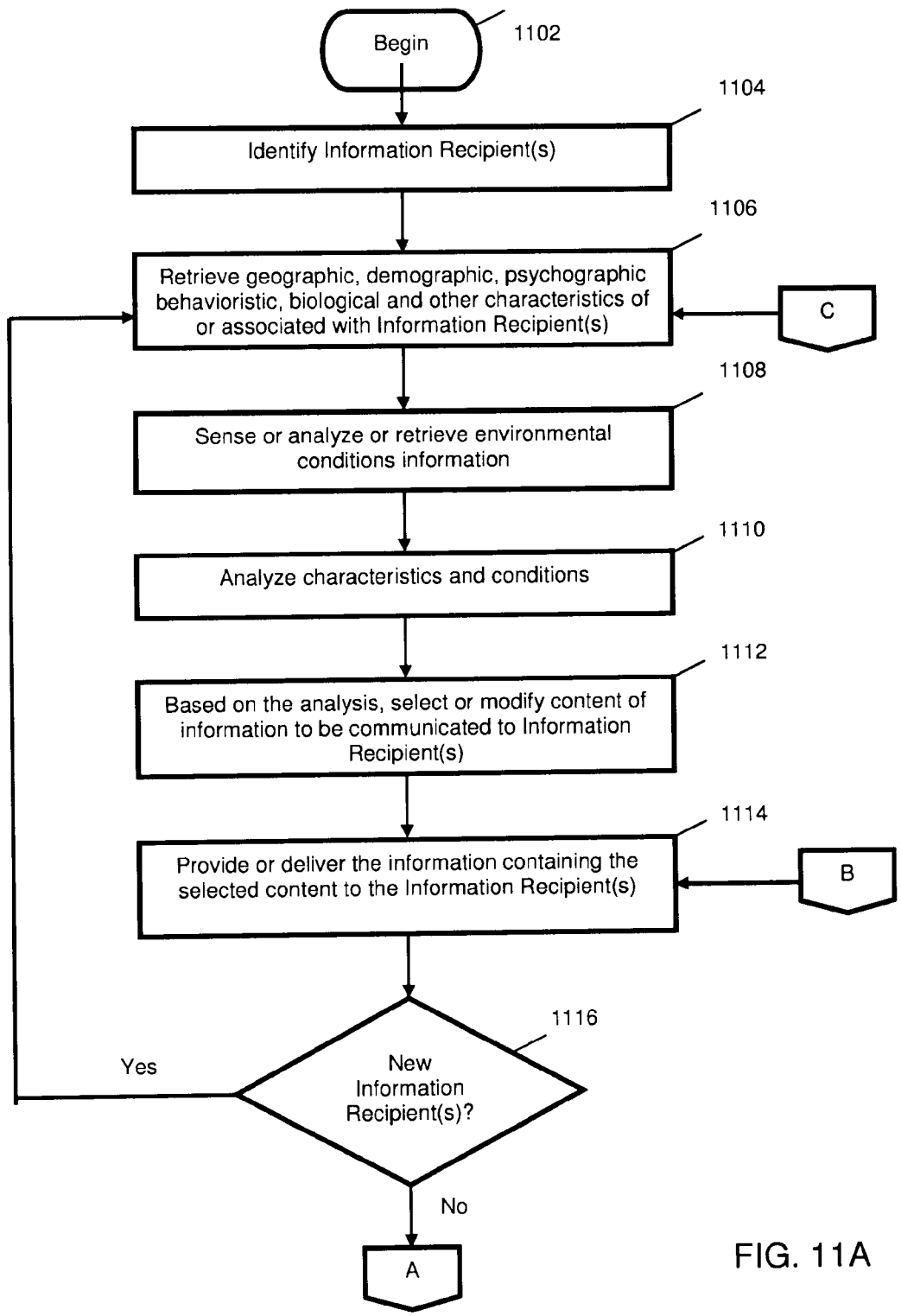
FIG. 11A and 11B are a process flow diagram illustrating some of the features of the present invention.
Figure 11B:
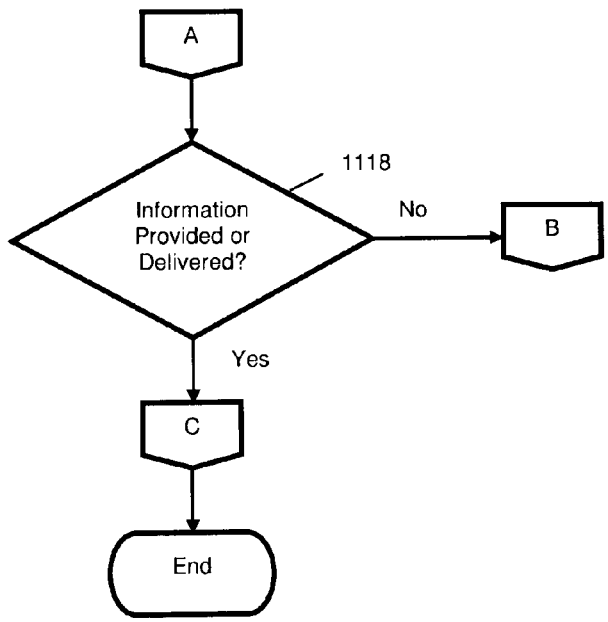

Turning now to FIGS. 11A and 11B, shown therein is a simplified block flow diagram illustrating one embodiment of the present invention. The process begins in block 1102 by initializing the overall system, starting the information agent 610 and information content generator 104, and ensuring connectivity among the various computing devices 402, storage devices 612, networks 602, 606 and 1012, and biometric sensing devices 1002, 1004, 1006, and 1010.

In step 1104, the system remotely, passively, and/or actively identifies the presence of information recipients at a pre-determined location (space or area) using one or more of the techniques previously described. In step 1106, the system retrieves from a storage device any known or pre-assessed geographic, demographic, psychographic, behavioristic, or other characteristics information, if available, that is associated with each of the identified information recipients. If that information is not available for each information recipient, or the information cannot be identified, the system may substitute information from other sources, such as statistical averages associated with the type of information recipient (i.e., if the information recipient is determined to be female, statistical average information for female consumers may be used), as previously described.

In step 1108, which is an optional step, the system also detects, observes, or retrieves environmental conditions information, which may include, but is not limited to, the time of day, amount of sunlight, sun angle, external temperature, internal temperature, internal humidity, actual and changes in atmospheric pressure, level of background noise, and the presence of rain or showers, all of which may have an effect on one or more of the characteristics identified in step 1106. For example, those skilled in the art will appreciate that a person's buying habits, tolerance for standing in line, receptivity to specific advertisements or entertainment information, etc., may be affected by the time of day, the external temperature, and whether it is late in the evening or early morning.

In step 1110, the information agent 510 and information content generator 104 input and analyze the characteristics information obtained in steps 1106 and 1108 in order to, in step 1112, assess the optimal information elements and final content that should be provided, delivered, outputted, etc., to the communications devices as the communication 102 which is sensible by the information recipients.

In step 1114, the communication 102 is provided, delivered, outputted, etc., to the information recipients via any one or more of communications modalities known to those of ordinary skill in the art. For example, communications modes and output devices include, but are not limited to, a television monitor that receives television broadcast signals; a radio that tunes radio frequency broadcast signals; a mobile telephony device, including those that receive and assemble data packets; a mobile computing device that receives and processes different types of signals; a satellite signal receiver that tunes radio and microwave frequency broadcast signals; an electronic roadside billboard that receives various frequency signals; and audio/or audio/visual display systems such as those at amusement or entertainment venues. Thus, those communications modes encompass or rely upon or incorporate circuit- and packet-switched electrical and optical networks, such as the Internet, telephony systems, and wireless systems such as Wi-Fi, Wi-MAX, and Bluetooth®, cable networks (including broadband), radio networks, satellite networks (including satellite radio), and various types of LANs and WANs, etc.

In decision step 1116, the information agent 510 checks to see if any new information recipients have entered or left the location of interest, as if so, loops back to step 1106 to retrieve new characteristics information associated with the new information recipient so that it may be combined with existing characteristics information.

In decision step 1118, the information agent 510 checks to see if the communication 102 has been completely delivered or provided (or downloaded, or viewed, etc.) by checking to see if each segment of the script of information 806 has been sent (by comparing the time for each segment against the time-line 812 and the actual local time of day. The terms "provided" or "delivered" are used broadly and synonymously with each other in this application and are not intended to limit the present invention to push- and pull-type techniques; the specific manner in which the information is provided, delivered, outputted, etc. from the information agent subsystem and computing device 402 to the various communications devices via communications modalities previously discussed is not limiting, only that the information be communicated.

The types of information that may be communicated to information recipients include, but are not limited to, news, advertisements (including product placement ads), entertainment, and data. The information will preferably be formatted digitally, such as in digital files that can easily be transferred by a packet-switched network.

IV. Applicability

The invention may be implemented in nearly any situation where information is to be communicated to a plurality of information recipients present at a given location. The following descriptions further illustrate various features and advantages of several embodiments of the invention. These descriptions are for illustrative purposes only, and are not intended to limit the scope of the invention in any way.

Entertainment venues are often used to communicate information to information recipients. In movie theaters, for example, it is the current practice of many theater owners to sell advertising time to advertisers who then use the theatre screens to project a static impression, typically in the form of audio and still video, prior to the showing of a movie in that theater. Several advertisements are often projected in series, and they are often interspersed with public announcements or non-advertising information. The content of the advertisements can include promoting other movies, promoting local food and beverage establishments, and sales of vehicles at local automobile dealerships.

Figure 12:
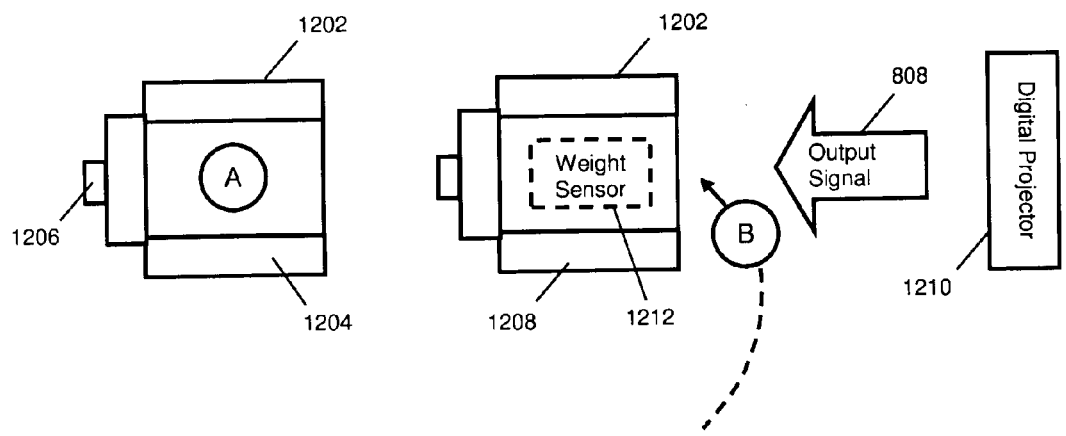
FIG. 12 is a schematic drawing showing one data collection device according to one embodiment of the present invention.

The present invention allows the movie theater advertisers to better target their advertising clients product message to an audience by dynamically assessing the changes in the characteristics that define the individuals entering, leaving, and remaining in the theater during the period of time when the advertisements are being shown. For example, as shown in FIG. 12, the information recipients present during the first five minutes of time when the advertisements are being shown (represented by information recipient A) may be determined to be predominantly white, female, over the age of 35, tend to shop at retail stores at a nearby mall, and have a household income in the range of $45,000-$75,000. Thus, the advertisements shown on the theater screen (output signal 808) are targeted to those information recipients in a dynamic fashion by selecting, from a plurality of available information elements, the information elements that will have the highest probability of effectively communicating the message that the advertiser wishes to communicate to that group of information recipients. Thus, a motor vehicle dealership that sells mostly pickup trucks would save money by not having its dealership advertisement impression shown during the first five minutes of the advertising segment.

Assume during the next five minutes of time when the advertisements are being shown, there is a steady influx of men over the age of 40 (represented by information recipient B), which may be predicted by the timing of ticket sales, assessed using ALI-equipped devices associated with movie-goer portable computing and telephony devices, etc. Then, during the next five minutes after that, individuals having known or assessable characteristics enter the theater, at which time the system of the present invention can then integrate those characteristics with the characteristics of the individuals already present in the theater. The advertisements shown on the theater screen (output signal 808) are then targeted to the collective group in a dynamic fashion, as the new characteristics are computed and analyzed. Thus, by knowing the influx, outflux, and presence of information recipients inside the movie theater, the effectiveness of the communication can be increased, which can translate into increased sales for the advertiser and, consequently, higher advertising revenue for the theater owner.

The movie theater owner/operator can implement the present invention in the following manner, which is one of several possible configurations. First, the theater seat 1202, which may be fixed or moveable (i.e., repositionable from one xyz coordinate position to a different xyz coordinate position) may include one or more biometric sensing devices 1204 that detect the presence of an information recipient, their weight, height, respiration rate, heart rate, facial features, fingerprints, and other characteristics. Remote camera/microphone 1206 may also be integrated into the seat backs to collect information about the information recipient who is seated in the seat behind the seat with the remote camera/microphone 1206. The information recipient A may be carrying a ALI-equipped mobile phone (not shown) that not only collects location information, but also collects audio information from the information recipient (i.e., laughter, lack of laughter, etc.). The theater seat 1202 may also include environmental sampling/monitoring device 1208 that detects environmental conditions near the information recipient, weight sensor 1212, which may be proximate to the theatre seat's bottom cushion, audio, movement, odor, or other sensors (not shown).

The theater owner's digital projector 1210, which will include an integrated memory or storage device that stores a plurality of information elements that are targeted to a specific group of information recipients, is connected to a communications manager (client side) (not shown) or to the information agent 510 (server side) over one or more communications networks 602. The communications manager or information agent automatically and continuously (or nearly continuously) receives input concerning one or more characteristics of information recipients entering the theater prior to the showing of a movie using any one or more of the techniques previously described. That input may include the identity and characteristics of the information recipient. The identity, as noted previously, may be obtained from a mobile phone service provider, ticket sales information, or biometric data, etc. The characteristics of the information recipient (i.e., geographic, demographic, psychographic and behavioristic characteristics), may be obtained from any one of the third-party purchase data sources previously described. The communications manager or information agent 510 then assesses which of the plurality of information elements is best suited to the information recipients present in the theater, and sends an instruction signal to the digital projector 1210 to load the information elements into the memory of the device and project the information into the theater as output signal 808 (including outputting sound through the theater's sound system). The information elements may be stored in a storage device associated with the communications manager integral to the digital projector 1210 or in an associated computing device (not shown), or they may be stored remotely, or they may stored both centrally and locally.

The theater owner raises revenue by charging advertisers a marginally higher advertising fees for use of the system and method of the present invention (compared to what he or she would have charged advertisers to advertise without the system and method of the present invention). Advertisers pay the premium fee in exchange for the effective method of communicating information to information recipients who are actually or predictably receptive and responsive to the information being communicated.

There are many means for advertising goods and services. Product placement is an increasingly popular technique used by advertisers who recognize that viewers with personal digital video recorders (PDVR) can easily forward through commercials, rendering that form of advertising products nearly worthless. Even in motion pictures, product placement has become a more formidable tool to ensure that a captive audience actually views a product. The same techniques described above can be used to display or project scenes in a movie that include visible products that appeal to the assembled group of moviegoers.

Such a technique would work effectively by providing, in a memory device, a plurality of nearly identical scenes (audio-visual multimedia materials) or static impressions that differ only in the product placed in the scene/impressions for advertising purposes. Thus, if a scene involves a vehicle, the vehicle type may change depending on the assessed characteristics of the audience. If the audience characteristic assessed in the manner described above indicates that the audience, as a whole, would be more receptive to seeing a black sports coupe than a white minivan, the system loads that scene into the correct order of scenes in a seamless and dynamic manner.

Restaurants can also benefit from the system and method of the present invention. Restaurants, especially those with televisions and other forms of audio and video communication (e.g., located in a bar or bathroom), may employ the techniques described herein to enhance the communication of information.

Similarly, shopping malls may be another location where the system and method of the present invention would be useful to advertisers and storeowners. For example, it is not uncommon for certain retail stores to project entertainment-style video on wall-mounted television monitors in, for example, a shoe department (i.e., a sports event displayed in a men's shoe department at a major retail store). The advertisements on those monitors may be dynamically adjusted in real-time or near real-time as the characteristics of the nearby information recipients changes.

Athletic stadiums and other similar forums, such as movie theaters already described above, are excellent locations for utilizing the system and method of the present invention. Those locations all have relatively predictable population segments that will become, for a predictable period of time, a captive audience, making the assessment of the group's characteristics somewhat easier. Advertising impressions displayed or projected on rotating signs, for example, can be dynamically tailored in accordance with the present invention to reflect the assessed characteristics of the audience as a whole. Because many athletic forums are large, various sections of the structure may attract information recipients having similar characteristics (i.e., patrons in the bleacher seats at a ball game would likely have a defining set of characteristics that are different than the characteristics of the patrons in one of the stadium's luxury sky boxes). Thus, the present invention can be used to tailor the communication of information to different sections of the structure in order to enhance the communication of information to information recipients throughout the facility.

As noted previously, transportation systems and facilities often utilize communications devices to communicate information to a segment of information recipients. For example, on airplanes, federal regulations require carriers to communicate safety information to passengers embarking on a trip. Often, that information is presented through the use of an audio-video system that displays a series of safety messages containing different segments of information (e.g., use of the lapbelt, what to do in an emergency, etc.). Those information segments are typically presented by a voice-over narrator or on-screen actor. The script is usually prepared in English and Spanish (or some other language, depending on the destination of the aircraft), but is usually shown in English with Spanish subtitles (or presented a second time in Spanish). The problem with those safety information presentations is that they are often ignored by passengers for many reasons. One way to increase the likelihood that those presentations are actually viewed is to slightly alter the message to reflect the characteristics of the passengers on the aircraft.

For example, the system and method of the present invention may be used to determine that the actual or estimated percentage of Spanish-speaking passengers on the aircraft is higher than non-Spanish-speaking passengers, or significantly higher than the statistical average for the city and region where the aircraft is gated. Thus, instead of showing an English version of the safety message with Spanish subtitles, a Spanish version of the safety message is displayed with English subtitles (or the Spanish version is shown first, followed by the English version). Moreover, the system and the method of the present invention may be used to determine that there are more passengers aged between 45-60 than there are passengers with ages between 18-35. That information could be used to select segments for the safety message that older passengers might be more responsive to, or at least more interested in. Those segments, for example, could include on-screen actors having roughly the same age as the majority of passengers and that mention safety tips that would be of interest to targeted segment of passengers. The various tailored portions of the information being communicated can be digitally collected by the system in a dynamic manner as information about the passengers is received, compiled into a final script, and loaded into a memory device of the aircraft's audio-video system and cued for display when needed.

In addition to aircraft, other transportation system may also benefit from the present invention, including trains, buses, and taxis. Taxis, especially those in countries outside the United States, are frequently equipped with headrest monitors that display advertising content to passengers inside the vehicle. Those advertisements may be tailored in real-time, or near real-time, to reflect the characteristics of the passengers inside the taxis or in the immediate region surrounding the taxi (i.e., a geographic area in which the taxi operates). Similarly, many taxis, as well as buses, have been used as moving billboards, with externally-mounted tent signs on top of taxis or signs adhered to buses being used to convey information to information recipients along those vehicles' paths. In connection with those vehicles, the system and method of the present invention is used to assess the collective characteristics of the individuals present on or near the street who have the highest probability of viewing the taxi or bus as it passes those individuals.

Another form of advertisement that could benefit from the present invention is the billboard. Some video billboards, or rotating billboards (i.e., in which the static or dynamic impression is changed at a pre-determined or other time period), are equipped with a computing device that controls the impression being presented to potential viewers. In the case of the present invention, individuals near the billboard, such as those gathering to take a train at a train station or waiting in their cars at a red light, for example, various means for monitoring information recipients as discussed previously and further below may be used to assess the information recipients to better identify their collective characteristics, which information will then be converted into an instruction that is sent to the computing device of the billboard in order to alter the impression being shown to effectively communicate the information to one or more information recipients.

Public and private waiting rooms that provide communications devices for presenting information to an assembled group of information recipients may also benefit from the system and method of the present invention. For example, as described previously, airport terminal gates often include television monitors that broadcast news, sports, weather, and other types of information to information recipients waiting to catch their flight. Healthcare practitioners and automobile service facilities often include a television monitor to entertain patients and customers, respectively, during their stay at those facilities. In the case of a doctor's office waiting area, if the majority of the information recipients are determined to be women who are mothers of children between the ages of 5 and 10 years old and which prefer an elderly woman to deliver their news and who like commercials of shorter duration disclosing specialty products, the television broadcast for the location where those information recipients are located would be automatically and nearly seamlessly adjusted to distribute that kind of content. As more individual join the group of information recipients, the content of the commercials might be automatically changed to include information that would likely appeal to the new segment of information recipients depending on feedback received.

As noted previously, commercial buildings may include many different modalities of communicating information to information recipients. In hotels, for example, it is not unusual to include a small television monitor located within elevators that are used to present financial news and weather information, or local advertisements for goods and services offered by the hotel and local businesses, in a continuous loop or as an updated, time-delayed broadcast. The system and method of the present invention may be used to select the content of the information being communicated. For example, two live broadcasts on different channels may include financial news content that are aimed at a slightly different audiences. Depending on the means used to monitor the information recipients on the elevator, including assessing characteristics of the passengers on the elevator, such as size, weight, audio level (talking), gender, length of time in the elevator (based on floor number button pushed), one of those channels may be selected over the other to be displayed on the monitor.

Figure 13:
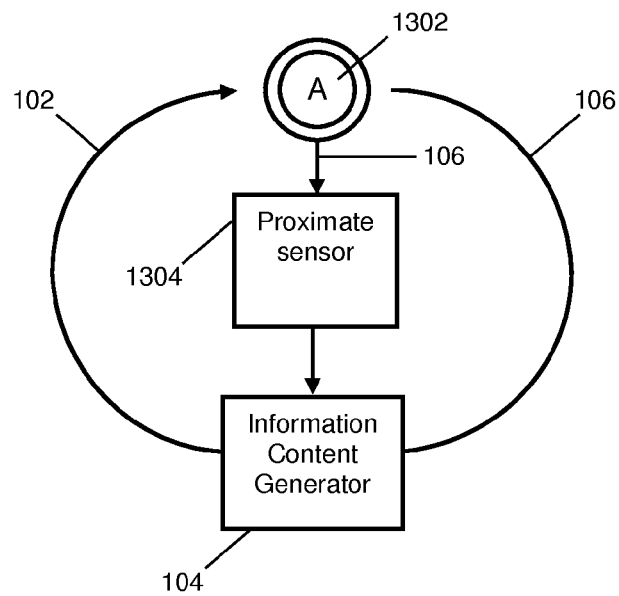
FIG. 13 is a schematic drawing showing another data collection device according to another embodiment of the present invention.

Turning now to FIG. 13, shown therein is one individual information recipient A who receives a communication 102 containing targeted content from an information content generator 104 via any one of many known or future communications modalities. The information recipient A may be described by various characteristics that reflect the information recipient's current state of being, such as the information recipient's mood, feelings, temperature, heart rate, etc. Some of those characteristics 106 may be outputted or outwardly exhibited or described through measurements, using sensors associated with the information content generator 104 (not shown), or embedded sensor 1302 in proximate sensor 1304 located at or near the information recipient A, and which may collect data about the information recipient's A physiological response to the communication 102. The characteristics 106 help identify the past, present, or future (predicted) state of being of the information recipient. The characteristics 106 are received by or input into the information content generator 104, which may use that information to adjust, if necessary, the targeted content in the communication 102.

Thus, various means for monitoring a plurality of information recipients include not only the various methods for identifying information recipients and the networked computing device, database, and database records information previously discussed, but also using proximate and remote sensors, such as sensors 1302, 1304 to assess physiological state characteristics of information recipients. Such sensors include, but are not limited to, those that assess, measure, predict, directly or indirectly, or otherwise determine a person's weight, physical motion or movement, temperature (e.g., surface skin or internal), sound level (i.e., talking), odors, cardiac information (e.g., physioelectrical signals), brain activity, blood chemical content, pupil dilation, head position, and biometric load, and bending and torsional stresses on joints, and changes thereto over time. Proximate sensor 1304 may be, for example, associated with a portable computing device, such as a hand-held mobile telephony device or a restaurant waiting area alert device, that senses pulse, oxygen content, audio, movement, location, electrical charges, and skin (hand) temperature. Audio sensors may be a microphone or piezoelectric sensors or a combination of both.

Figure 14:
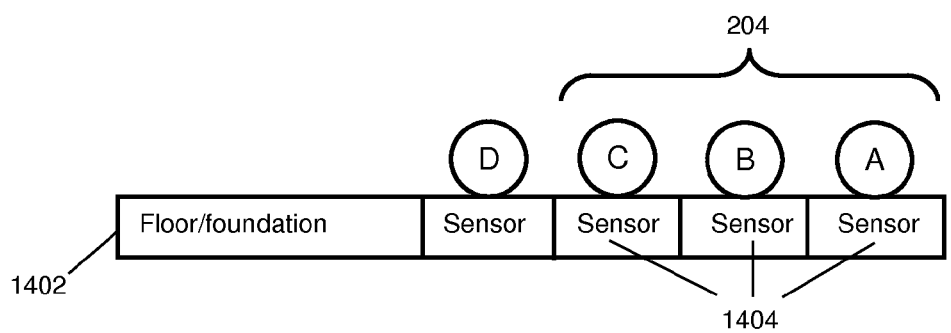
FIG. 14 is a schematic drawing showing yet another data collection device according to another embodiment of the present invention.

Turning now to FIG. 14, shown therein is a schematic drawing showing an elevation view of a portion of an amusement or entertainment venue staging area (e.g., a waiting area or line) that may also benefit from the present invention. Information recipients A, B, and C (or their computing devices) (collectively reference 204) are shown waiting in a line or grouped together in a staging area of an amusement ride or entertainment show waiting to advance to a different part of the line or staging area. The floor or foundation 1402 upon which the information recipients 204 are located is equipped with one or more sensors 1404 that may collect characteristics information about the information recipients, such as weight and relative motion, thereby providing a means for monitoring the information recipients at that location.

Retail stores may also benefit from the present invention by monitoring the influx, outflux, and presence of information recipients in a retail store, and assessing the characteristics of those information recipients in order to tailor communications provided to those information recipients while they are shopping. For example, at a point of sale (POS) device, a cashier may be presented with a script displayed on the graphical user interface of the POS device to be read to an information recipient or group of information recipients when transactions are being completed. The script may include an up-sale or promotional message tailored to the information recipients or segment of information recipients inside the retail store. The visual aspect of a communication being presented to information recipient may include not only a static advertising impression, but also the level of illumination, heating, cooling, and other sensible environmental conditions within the retail store, all of which may be adjusted based on characteristics of the information recipients or segment of information recipients being assessed by the system of the present invention.

The present invention may include computer-implemented instructions stored on a single or distributed on multiple computer-readable media devices, including magnetically readable computer discs. Computer-implemented instructions, database data structures, indices of stored information content, instructions for generating displayed information on a graphical user interface device, and other data or information stored or provided, delivered, etc., as part of the invention may be distributed over any packet-switched or circuit-switched network, including the Internet (and also including wireless networks such as broadcast networks), in the form of electronic signals propagated over any suitable medium during a pre-determined or other time period. Portions of the invention may reside on a server computer, while other portions may reside on a client computer such as a desktop or portable personal computer, or communications device, which may be part of the server or the client device.

The system and method of the present invention may be initiated by an information recipient who downloads to his or her portable computing device, such as a smart telephony device, an application that, when run, automatically determines the location of the information recipient using, for example, the device's ALI device; mines for personal information from the computing devices memory, including, for example, the information recipient's name; measures acceleration of the device using, for example, the device's accelerometers; initiates sensors associated with the device (integral to or remote from the device but operatively connection to the device either wired or wirelessly); begins logging measurements from the sensors; launches a form to request additional information, including preferences, from the information recipient using the device's input/output interface, which may include a virtual or mechanical keyboard; connects to the computing device 402 via a wireless network; uploads location, personal information, sensor data, and form data to the computing device 402 so the computing device 402 may store the information in a database or storage device 612; and, optionally, receives information concerning a script or information about individual script segments and instructions from the computing device 402 to output to the device one or more specific scripts or script segments to the information recipient as a communication 102.

Those skilled in the relevant art will appreciate that terminology used herein to describe features, aspects, or advantages of the invention should not be construed as implying that the terminology is being redefined herein. In general, the terminology used to describe and claim the present invention should not be construed to limit the invention to the specific disclosed embodiments. That is, the invention encompasses not only the specific disclosed embodiments, but also any equivalent ways of practicing or implementing the present invention.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A computer-implemented method comprising:
monitoring a facial feature of at least one information recipient using a camera device when the at least one information recipient is at a pre-determined location, space, or area and when a first information element is outputting, the first information element comprising content;
identifying a physiological state or identifying a change in the physiological state of the at least one information recipient based on at least the monitored facial feature;
classifying at least one response by the at least one information recipient based on the identified physiological state or the identified change in the physiological state;
storing in one or more databases or computing devices one or more of at least one non-physiological state information associated with the at least one information recipient or other information recipients, one or more of the classified at least one response, the identified physiological state, the identified change in the physiological state, and the monitored facial feature of the at least one information recipient; and
identifying a different content to replace some of the first information element content or identifying a second information element to replace the entire first information element, based on at least the one non-physiological state information associated with the at least one information recipient or the other information recipients and one or more of the classified at least one response, the identified physiological state, the identified change in the physiological state, and the monitored facial feature of the at least one information recipient.

2. The method of claim 1, further comprising comparing the identified physiological state or the identified change in the physiological state to one or more pre-determined criteria.

3. The method of claim 1, wherein the first information element is all or a portion of a first advertisement, and wherein the different content and the second information element are all or a portion of a second advertisement.

4. The method of claim 1, wherein the pre-determined location is a website.

5. A computer-implemented system comprising:
a portable device for providing information for use in identifying a presence of an information recipient at a pre-determined location, space, or area during a pre-determined time period;
a biometric sensor in, on or near the information recipient useful in identifying a physiological state or identifying a change in the physiological state of the information recipient;
a database for storing information of or about the information recipient, the stored information comprising the identified physiological state or the identified change in the physiological state information, and at least one non-physiological state information; and
an information content generator for generating at least one information element for communication to the information recipient at a time during the pre-determined time period, wherein the information element is selected based on the at least one non-physiological state information and the identified physiological state or the identified physiological change information.

6. The system of claim 5, wherein the portable device comprises a radio frequency identification (RFID) component adapted to providing the information useful in identifying the information recipient when the portable device is proximate to an RFID interrogator.

7. The system of claim 6, wherein the RFID interrogator is adapted to communicating the provided information to the information content generator.

8. The system of claim 5, wherein the pre-determined location, space, or area is at a public venue.

9. A system comprising:
at least one biometric sensors at a pre-determined location, space, or area for measuring at least one physiological state characteristic of one or more information recipients when the one or more information recipients are physically present at the pre-determined location, space, or area;
an information recipient profile database comprising the measured at least one physiological state characteristic or information related to the measured at least one physiological state characteristic, and at least one non-physiological state characteristic associated with the one or more information recipients or information related to at least one non-physiological state characteristic associated with the one or more information recipients; and
an information content generator for providing to a communications device an information element based on the measured at least one physiological state characteristic, the information related to the measured at least one physiological state characteristic, the at least one non-physiological state characteristic associated with the one or more information recipients, or the information related to at least one non-physiological state characteristic associated with the one or more information recipients.

10. The communications system according to claim 9, wherein the information element comprises one or more of a portion of or a whole static advertisement impression, a web site, a motion picture, a script, a broadcast television show, a broadcast radio or television commercial, and a billboard advertisement.

* * * * *